United States Patent
Han et al.

(10) Patent No.: US 11,917,450 B2
(45) Date of Patent: *Feb. 27, 2024

(54) DATA TRANSMISSION METHOD AND DATA TRANSMISSION APPARATUS

(71) Applicant: HUAWEI TECHNOLOGIES CO., LTD., Guangdong (CN)

(72) Inventors: Lifeng Han, Shenzhen (CN); Rui Wang, Shanghai (CN); Mingzeng Dai, Shenzhen (CN); Hongping Zhang, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 177 days.

This patent is subject to a terminal disclaimer.

(21) Appl. No.: 17/459,667

(22) Filed: Aug. 27, 2021

(65) Prior Publication Data
US 2022/0060931 A1 Feb. 24, 2022

Related U.S. Application Data

(63) Continuation of application No. 16/563,302, filed on Sep. 6, 2019, now Pat. No. 11,109,263, which is a
(Continued)

(51) Int. Cl.
*H04W 28/02* (2009.01)
*H04W 76/12* (2018.01)
(Continued)

(52) U.S. Cl.
CPC ....... *H04W 28/0268* (2013.01); *H04W 36/30* (2013.01); *H04W 76/12* (2018.02); *H04W 80/08* (2013.01)

(58) Field of Classification Search
CPC . H04W 28/0268; H04W 36/30; H04W 76/12; H04W 80/08
See application file for complete search history.

(56) References Cited

U.S. PATENT DOCUMENTS 10,419,985 B2 *  9/2019  Kim ..................... H04W 36/14
2009/0225705 A1  9/2009  Kwon
(Continued)

FOREIGN PATENT DOCUMENTS

CN  101132609  2/2008
CN  101272315  9/2008
(Continued)

OTHER PUBLICATIONS

3GPP TS 23.502 V0.5.0 (Jul. 2017), "3rd Generation Partnership Project; Technical Specification Group Services and System Aspects; Procedures for the 5G System; Stage 2 (Release 15)," Jul. 2017, 148 pages.
(Continued)

*Primary Examiner* — Deepa Belur
(74) *Attorney, Agent, or Firm* — Fish & Richardson P.C.

(57) ABSTRACT

This application provides a transmission method and a data transmission apparatus, so as to avoid out-of-order of data packets. The method includes: sending, by a source access network device, a first proportion of data packets in a first Packet Data Convergence Protocol PDCP entity in the source access network device to a target access network device by using a data tunnel between the source access network device and a second PDCP entity of the target access network device, where the first proportion of data packets are data packets of a first quality of service QoS flow in a first protocol data unit PDU session, the first PDU session includes at least one QoS flow, the at least one QoS flow corresponds to at least one PDCP entity, the at least one QoS flow includes the first QoS flow, the at least one PDCP
(Continued)

entity includes the first PDCP entity, and the first PDCP entity corresponds to the first QoS flow; and sending, by the source access network device, first indication information to the target access network device, where the first indication information is used to indicate that all the first proportion of data packets in the first PDCP entity have been sent.

19 Claims, 14 Drawing Sheets

Related U.S. Application Data continuation of application No. PCT/CN2018/099967, filed on Aug. 10, 2018.

(51) Int. Cl.
*H04W 36/30* (2009.01)
*H04W 80/08* (2009.01)

(56) References Cited

U.S. PATENT DOCUMENTS

| | | | |
|---|---|---|---|
| 2010/0111041 | A1 | 5/2010 | Lim et al. |
| 2012/0219018 | A1 | 8/2012 | Shi |
| 2013/0058308 | A1 | 3/2013 | Jaiswal et al. |
| 2014/0105011 | A1 | 4/2014 | Chandramouli et al. |
| 2015/0009826 | A1* | 1/2015 | Ma .............. H04W 72/569 370/235 |
| 2016/0105838 | A1 | 4/2016 | Wang et al. |
| 2017/0142770 | A1 | 5/2017 | Fu et al. |
| 2017/0245184 | A1* | 8/2017 | Nagesh Shetigar ..... H04J 11/00 |
| 2017/0332301 | A1 | 11/2017 | Horn et al. |
| 2017/0373950 | A1* | 12/2017 | Szilagyi .............. H04L 47/2416 |
| 2018/0192342 | A1 | 7/2018 | Lim et al. |
| 2019/0074894 | A1* | 3/2019 | Gopal ................ H04B 7/18513 |
| 2019/0313295 | A1 | 10/2019 | Xu et al. |
| 2020/0015116 | A1 | 1/2020 | Huang et al. |
| 2020/0015138 | A1* | 1/2020 | Zhu ................... H04W 36/0016 |
| 2022/0264370 | A1* | 8/2022 | Qiao ................... H04L 12/1407 |

FOREIGN PATENT DOCUMENTS

| | | | |
|---|---|---|---|
| CN | 101365239 | | 2/2009 |
| CN | 101572929 | | 11/2009 |
| CN | 102045802 | | 5/2011 |
| CN | 103765955 | A | 4/2014 |
| CN | 103888222 | | 6/2014 |
| CN | 104994551 | | 10/2015 |
| CN | 106851856 | | 6/2017 |
| CN | 106941733 | | 7/2017 |
| CN | 107027136 | | 8/2017 |
| EP | 2187664 | | 6/2014 |
| GB | 2551485 | A | 12/2017 |
| KR | 20140036245 | | 3/2014 |
| KR | 20140062109 | | 5/2014 |
| WO | 2016099058 | A1 | 6/2016 |
| WO | WO-2017222344 | A1 * | 12/2017 .......... H04W 36/023 |
| WO | 2018030982 | | 2/2018 |
| WO | 2018110952 | A2 | 6/2018 |

OTHER PUBLICATIONS

3GPP TS 37.340 V0.2.1 (Aug. 2017), "3rd Generation Partnership Project; Technical Specification Group Radio Access Network; Evolved Universal Terrestrial Radio Access (E-UTRA) and NR; Multi-connectivity; Stage 2 (Release 15)," Aug. 9, 2017, 43 pages.
3GPP TS 38.300 V0.6.0 (Aug. 2017), "3rd Generation Partnership Project; Technical Specification Group Radio Access Network; NR; NR and NG-RAN Overall Description; Stage 2 (Release 15)," Aug. 7, 2017, 58 pages.
3GPP TS 38.323 V0.2.0 (Aug. 2017), "3rd Generation Partnership Project; Technical Specification Group Radio Access Network; NR; Packet Data Convergence Protocol (PDCP) specification (Release 15)," Jul. 19, 2017, 27 pages.
3GPP TS 38.413 V0.2.1 (Aug. 2017), "3rd Generation Partnership Project; Technical Specification Group Radio Access Network; NG Radio Access Network (NG-RAN); NG Application Protocol (NGAP) (Release 15)," Aug. 9, 2017, 81 pages.
3GPP TS 38.423 V0.1.1 (Jun. 2017), "3rd Generation Partnership Project; Technical Specification Group Radio Access Network; NG Radio Access Network (NG-RAN);Xn application protocol (XnAP) (Release 15)," Jun. 19, 2017, 53 pages.
Catt, "Considerations on the flow control," 3GPP TSG-RAN WG3 #86, R3-142744, San Francisco, USA, Nov. 17-21, 2014, 2 pages.
Ericsson, ZTE, "Notes on email-discussion#03 on data forwarding for split bearers," 3GPP TSG-RAN WG3 Meeting #86, R3-142925, San Francisco, CA, U.S., Nov. 17-21, 2014, 7 pages.
Extended European Search Report issued in European Application No. 18843032.5 dated May 4, 2020, 10 pages.
Huawei, "Data Forwarding For QoS Flow Remapping During Mobility," 3GPP TSG-RAN WG3 #96, R3-171810, Hangzhou, PR China, May 15-19, 2017, 4 pages.
Huawei, "Data forwarding with QoS flow relocation", 3GPP TSG-RAN3 Meeting # 95bis, R3-171072, Spokane, Washington, USA, Apr. 3-7, 2017, 6 pages.
Huawei, HiSilicon, "TS 23.502 End-Marker during HO Procedure," SA WG2 Meeting #122, S2-174546, San Jose Del Cabo, Mexico, Jun. 26-30, 2017, 13 pages.
Intel, "Solution for mobility in the EPC=>5GC direction," 3GPP TSG SA WG2 Meeting #121, S2-173522, Hangzhou, PR China, May 15-19, 2017, 4 pages.
Nokia et al., "Traffic offloading in NR-NR DC," 3GPP TSG-RAN WG2 Meeting #98, R2-1704270, Hangzhou, China, May 15-19, 2017, 3 pages.
Office Action issued in Chinese Application No. 201811004473.3 dated Apr. 25, 2019, 8 pages.
Office Action issued in Chinese Application No. 201811004473.3 dated Aug. 29, 2019, 6 pages (with English translation).
Office Action issued in Chinese Application No. 201811004473.3 dated Feb. 19, 2019, 15 pages (with English translation).
Office Action issued in Japanese Application No. 2020-507598 dated Apr. 27, 2021, 4 pages (with English translation).
Office Action issued in Korean Application No. 2020-7006996 dated Jan. 12, 2021, 8 pages (with English translation).
PCT International Search Report and Written Opinion issued in International Application No. PCT/CN2018/099967 dated Dec. 31, 2018, 15 pages (with English translation).
Samsung, "TS 23.502: Updates to Inter NG-RAN Node HO Procedure (Section 4.9.1.2.2)," SA WG2 Meeting #121, 82-173651, Hangzhou, China, May 15-19, 2017, 6 pages.
Search Report issued in Chinese Application No. 201811004473.3 dated Nov. 1, 2018, 6 pages.
ZTE, "Further discussion on QoS impact on mobility," 3GPP TSG-RAN WG3 # 95, R3-170562, Athens, Greece, Feb. 13-17, 2017, 4 pages.
3GPP TS 36.300 V14.3.0 (Jun. 2017), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14)," Jun. 2017, 331 pages.
3GPP TS 23.401 V15.0.0 (Jun. 2017), "3rd Generation Partnership Project; Technical Specification Group Services and System Aspects; General Packet Radio Service (GPRS) Enhancements for Evolved Universal Terrestrial Radio Access Network (E-UTRAN) Access (Release 15)," Jun. 2017, 386 pages.
Extended European Search Report issued in European Application No. 22157982.4 dated Oct. 24, 2022, 12 pages.
Ericsson, "QoS—Continuation of stage 3 work," 3GPP TSG RAN WG3 #96, R3-171708, Hangzhou, China, May 15-19, 2017, 15 pages.
Ericsson, "TP to clarify that S-GW relocation cannot happen during DC activities," 3GPP TSG-RAN WG3 #84, R3-141322, Seoul, South Korea, May 19-23, 2014, 3 pages.

(56) References Cited

OTHER PUBLICATIONS

Office Action issued in Japanese Application No. 2021-089396 dated May 31, 2022, 4 pages (with English translation).
Samsung, "Data forwarding for Inter-system Inter-RAT handover between NR and E-UTRA," 3GPP TSG RAN WG3, R3-172224, Qingdao, China, Jun. 27-29, 2017, 5 pages.
Huawei, HiSilicon, "TS 23.502 End-Marker during HO Procedure," SA WG2 Meeting #122, S2-174546, San Jose Del Cabo, Mexico, Jun. 26-30, 2017, 15 pages.
Huawei, HiSilicon, "QoS Flow to DRB Re-Mapping," 3GPP TSG-RAN WG2 Meeting #98, R2-1704987, Hangzhou, China, May 15-19, 2017, 6 pages.
Office Action issued in Chinese Application No. 201710687846.0 dated Jul. 15, 2022, 6 pages.
Huawei, HiSilicon, "QoS Flow to DRB Mapping," 3GPP TSG-RAN2 Meeting #97, R2-1701205, Athens, Greece, Feb. 13-17, 2017, 6 pages.
Office Action issued in Japanese Application No. 2021-089396 dated Sep. 20, 2022, 4 pages (with English translation).

* cited by examiner

DATA TRANSMISSION METHOD AND DATA TRANSMISSION APPARATUS

CROSS-REFERENCE TO RELATED APPLICATIONS

This application is a continuation of U.S. application Ser. No. 16/563,302, filed on Sep. 6, 2019, now U.S. Pat. No. 11,109,263, which is a continuation of International Application No. PCT/CN2018/099967, filed on Aug. 10, 2018, which claims priority to Chinese Patent Application No. 201710687846.0, filed on Aug. 11, 2017. All of the aforementioned patent applications are hereby incorporated by reference in their entireties.

TECHNICAL FIELD

This application relates to the communications field, and more specifically, to a data transmission method and a data transmission apparatus.

BACKGROUND

In a Long Term Evolution (LTE) communications system, when a terminal moves on an access network side, a network element of an access network that sends and receives data changes, and the network element of the access network instructs a network element of a core network to change a user plane data tunnel, thereby ensuring service continuity. However, for a changed user plane data tunnel of the core network, an end marker is sent over the old data tunnel, to notify the end of sending a downlink data packet, where the user plane data tunnel is established based on an evolved packet system (EPS) bearer.

However, in a next-generation communications system, a quality of service (QoS) architecture based on a QoS flow is introduced. A data packet tunnel is established between a network element of a core network and a network element of an access network based on a packet data unit (PDU) session, and one PDU session may include one or more QoS flows. Therefore, when a terminal is moving, a data tunnel of one or more QoS flows may need to be changed, or a data tunnel of the PDU session may need to be changed. How the network element of the core network sets an end marker is a problem that needs to be resolved.

SUMMARY

This application provides a transmission method and a data transmission apparatus, so as to avoid out-of-order of data packets.

According to a first aspect, a transmission method is provided, including: sending, by a source access network device, a first proportion of data packets in a first Packet Data Convergence Protocol (PDCP) entity in the source access network device to a target access network device by using a data tunnel between the source access network device and a second PDCP entity of the target access network device, where the first proportion of data packets are data packets of a first quality of service (QoS) flow in a first protocol data unit (PDU) session, the first PDU session includes at least one QoS flow, the at least one QoS flow is in one-to-one correspondence with at least one PDCP entity, the at least one QoS flow includes the first QoS flow, the at least one PDCP entity includes the first PDCP entity, the first PDCP entity corresponds to the first QoS flow, and the first QoS flow is any one of the at least one QoS flow; and sending, by the source access network device, first indication information to the target access network device, where the first indication information is used to indicate that all the first proportion of data packets in the first PDCP entity have been sent.

Optionally, the first indication information includes a largest PDCP sequence number in PDCP sequence numbers carried by all data packets in the first proportion of data packets; or the first indication information includes a next to-be-allocated PDCP sequence number; or the first indication information is an end marker packet generated by the first PDCP entity.

Optionally, before the sending, by the source access network device, a first proportion of data packets in the first PDCP entity to the target access network device, the method further includes: determining, by the source access network device, that a first Service Data Adaptation Protocol (SDAP) entity in the source access network device stops sending data packets of the first QoS flow to the first PDCP entity, where the data packets of the first QoS flow that are sent by the first SDAP entity to the first PDCP entity are the first proportion of data packets, and the first SDAP entity corresponds to the first PDU session.

Optionally, the second indication information is sent by the first SDAP entity based on an end marker packet received from a core network user plane device.

According to a second aspect, a transmission method is provided, including: receiving, by a target access network device by using a data tunnel between a second PDCP entity of the target access network device and a first PDCP entity of a source access network device, a first proportion of data packets sent by the first PDCP entity, where the first proportion of data packets are data packets of a first quality of service QoS flow in a first protocol data unit PDU session, the first PDU session includes at least one QoS flow, the at least one QoS flow is in one-to-one correspondence with at least one PDCP entity, the at least one QoS flow includes the first QoS flow, the at least one PDCP entity includes the first PDCP entity, the first PDCP entity corresponds to the first QoS flow, the second PDCP entity corresponds to the first QoS flow, and the first QoS flow is any one of the at least one QoS flow; and receiving, by the target access network device, first indication information sent by the source access network device, where the first indication information is used to indicate that the first PDCP entity has sent all the first proportion of data packets.

Optionally, the method further includes: after determining, based on the first indication information, that all data packets in the first proportion of data packets have been sent to a terminal, sending, by the target access network device, a data packet received from a second SDAP entity of the target access network device to the terminal.

Optionally, the first indication information includes a largest PDCP sequence number in PDCP sequence numbers carried by all the data packets in the first proportion of data packets; or the first indication information includes a next to-be-allocated PDCP sequence number; or the first indication information is an end marker packet generated by the first PDCP entity.

According to a third aspect, a transmission method is provided, including: if it is determined that a terminal no longer sends a data packet of at least one quality of service QoS flow in a first PDU session to a source access network device, generating, by the source access network device, trigger information; and sending, by the source access network device, the trigger information to a target access network device, where the trigger information is used to instruct the target access network device to send, to a core network user plane device, a data packet that is of the at least one QoS flow and that is sent by the terminal to the target access network device, and the trigger information includes an identity of the at least one QoS flow and an identity of the first PDU session; or the trigger information includes an identity of the at least one QoS flow and an identity of a first data radio bearer (DRB), and the first DRB corresponds to the at least one QoS flow.

According to a fourth aspect, a transmission method is provided, including: receiving, by a target access network device, trigger information sent by a source access network device, where the trigger information is used to instruct the target access network device to send, to a core network user plane device, a data packet that is of at least one quality of service QoS flow in a first PDU session and that is sent by the terminal to the target access network device, and the trigger information includes an identity of the at least one QoS flow and an identity of the first PDU session; or the trigger information includes an identity of the at least one QoS flow and an identity of a first data radio bearer DRB, and the first DRB corresponds to the at least one QoS flow; and sending, by the target access network device to the core network user plane device based on the trigger information, the data packet that is of the at least one QoS flow and that is sent by the terminal to the target access network device.

Optionally, the trigger information is an end marker packet, or the trigger information is a message between access network devices.

According to a fifth aspect, a transmission method is provided, including: if a source access network device determines that a terminal receives a data packet that is of at least one quality of service QoS flow in a first PDU session and that is sent by the source access network device, generating, by the source access network device, trigger information; and sending, by the source access network device, the trigger information to a target access network device, where the trigger information is used to instruct the target access network device to start to send, to the terminal, a data packet that is of the at least one QoS flow and that is received by the target access network device from a core network user plane device, and the trigger information includes an identity of the at least one QoS flow and an identity of the first PDU session; or the trigger information includes an identity of the at least one QoS flow and an identity of a first data radio bearer DRB, and the first DRB corresponds to the at least one QoS flow.

According to a sixth aspect, a transmission method is provided, including: receiving, by a target access network device, trigger information sent by a source access network device, where the trigger information is used to instruct the target access network device to start to send, to a terminal, a data packet that is of at least one quality of service QoS flow in a first PDU session and that is received by the target access network device from a core network user plane device, and the trigger information includes an identity of the at least one QoS flow and an identity of the first PDU session; or the trigger information includes an identity of the at least one QoS flow and an identity of a first data radio bearer DRB, and the first DRB corresponds to the at least one QoS flow; and sending, by the target access network device to the terminal based on the trigger information, the data packet that is of the at least one QoS flow and that is received from the core network user plane device.

Optionally, the trigger information is an end marker packet, or the trigger information is a control plane message between access network devices.

According to a seventh aspect, a data transmission apparatus is provided, including units for performing the steps of the transmission method according to any one of the first to the sixth aspects and the implementations thereof.

In a design, the data transmission apparatus is a communications chip, and the communications chip may include an input circuit or interface for sending information or data, and an output circuit or interface for receiving information or data.

In another design, the data transmission apparatus is a communications device, and the communications chip may include a transmitter for sending information or data, and a receiver for receiving information or data.

According to an eighth aspect, a communications device is provided, including: a processor and a memory, where the memory is configured to store a computer program, and the processor is configured to invoke the computer program from the memory and run the computer program, so that the communications apparatus performs the transmission method according to any one of the first to the sixth aspects and the possible implementations thereof.

Optionally, there are one or more processors and one or more memories.

Optionally, the memory may be integrated with the processor, or the memory is separate from the processor.

Optionally, the communications device further includes a transmitter and a receiver.

According to a ninth aspect, a computer program product is provided, where the computer program product includes a computer program (which may also be referred to as code or an instruction), and when the computer program runs, a computer performs the method according to any one of the possible implementations of the first to the sixth aspects.

According to a tenth aspect, a computer readable medium is provided, where the computer readable medium stores a computer program (which may also be referred to as code or an instruction), and when the computer program runs on a computer, the computer performs the method according to any one of the possible implementations of the first and the second aspects.

According to a ninth aspect, a chip system is provided, including a memory and processor, where the memory is configured to store a computer program, and the processor is configured to invoke the computer program from the memory and run the computer program, so that a communications device provided with the chip system performs the method according to any one of the possible implementations of the first to the sixth aspects.

DESCRIPTION OF EMBODIMENTS

In a next-generation communications system, an architecture based on a quality of service flow (QoS flow) is proposed, and the architecture supports a guaranteed bit rate (GBR) QoS flow and a non-guaranteed bit rate (non-GBR) QoS flow.

Figure 1:
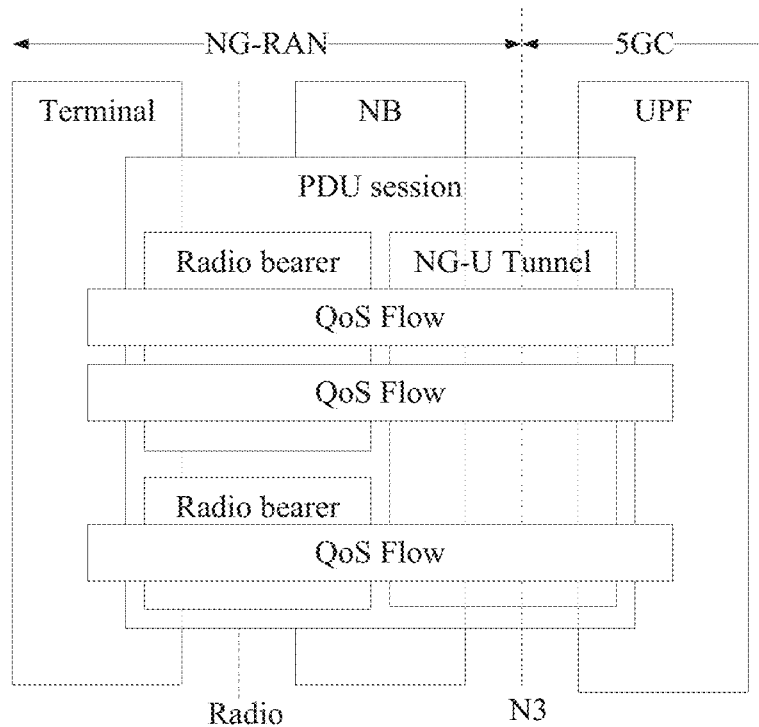
FIG. 1 is a schematic architectural diagram of a communications system according to an embodiment of this application.

Referring to FIG. 1, FIG. 1 shows a QoS architecture in 5G. As shown in FIG. 1, for each terminal, a base station establishes one or more data radio bearers (DRBs) for each PDU session of the terminal. The base station maps data packets of different PDU sessions to different DRBs. A QoS flow is a finest granularity of QoS differentiation for a PDU session. The PDU session is a connection between the terminal and an external data network to provide a packet data unit connectivity service. Each PDU session has a unique identity, and the unique identity of the PDU session may be a PDU session identity. The QoS flow is a set of data packets, where data packets of a same QoS flow have same QoS characteristics, and same packet forwarding and processing are performed on the data packets in a 3GPP network.

A packet processing mechanism on an air interface is defined based on a DRB in 5G. Packets served by a same DRB have a same packet processing mechanism on the air interface. The base station may establish a plurality of DRBs to meet different packet processing requirements of QoS flows.

For example, for a downlink, the base station maps a downlink data packet of a QoS flow to a DRB based on a QFI identity and a corresponding QoS profile on an NG-U (that is, an N3 interface). For an uplink, UE maps an uplink data packet of a QoS flow to a DRB based on mapping or reflective mapping that is from the QoS flow to the DRB and that is configured by the base station.

The technical solutions of the embodiments of this application may be applied to various communications systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, a future 5th generation (5G) system, and a New Radio (NR) system.

The terminal in the embodiments of this application may be user equipment, an access terminal, a subscriber unit, a subscriber station, a mobile site, a mobile station, a remote station, a remote terminal, a mobile device, a user terminal, a terminal device, a wireless communications device, a user agent, or a user apparatus. The terminal device may alternatively be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN), or the like. This is not limited in the embodiments of this application.

The access network device or the base station in the embodiments of this application may be a device for communicating with the terminal. The network device may be a base transceiver station (BTS) in the Global System for Mobile Communications (GSM) system or the Code Division Multiple Access (CDMA) system, or may be a NodeB (NB) in the Wideband Code Division Multiple Access (WCDMA) system, or may be an evolved NodeB (eNB or eNodeB) in the LTE system, or may be a radio controller in a cloud radio access network (CRAN) scenario. Alternatively, the network device may be a relay station, an access point, an in-vehicle device, a wearable device, a network device in the future 5G network, a network device in the future evolved PLMN, or the like. This is not limited in the embodiments of this application.

A core network device in the embodiments of this application includes a core network control plane device and a core network user plane device.

A next-generation radio access network (NG-RAN) includes a gNB and/or an evolved eNB. The gNB provides an NR control plane and user plane protocol stack that terminates at the terminal. The evolved eNB is an evolved LTE base station connected to a 5G core network. In description of this application, the gNB and the evolved eNB may be collectively referred to as a base station.

The gNB provides at least one of the following functions: access control, connection mobility management, radio bearer control, measurement configuration, dynamic resource allocation, and the like.

An Access and Mobility Management Function (AMF) provides at least one of the following functions: non-access stratum (NAS) security management, access stratum (AS) security control, mobility management, terminal access verification, registration area management, slice support, session management function (SMF) selection, and the like.

A User Plane Function (UPF) provides at least one of the following functions: anchor handover, data packet routing and forwarding, QoS management, and the like.

An SMF provides at least one of the following functions: session management, terminal IP address allocation and management, UPF selection and control, and the like.

A next-generation core network control plane device includes but is not limited to the AMF and the SMF. A next-generation core network user plane device includes but is not limited to the UPF.

An interface between the AMF and the NG-RAN is defined as an N2 interface, and an interface between the UPF and the NG-RAN is defined as an N3 interface. An interface between gNBs is defined as an Xn interface.

Start-to-send information and trigger information in the embodiments of this application are interchangeable with each other. An SN may be a secondary base station, and an MN may be a master base station.

In the following description, the access network device and the base station are interchangeable with each other.

Figure 2:
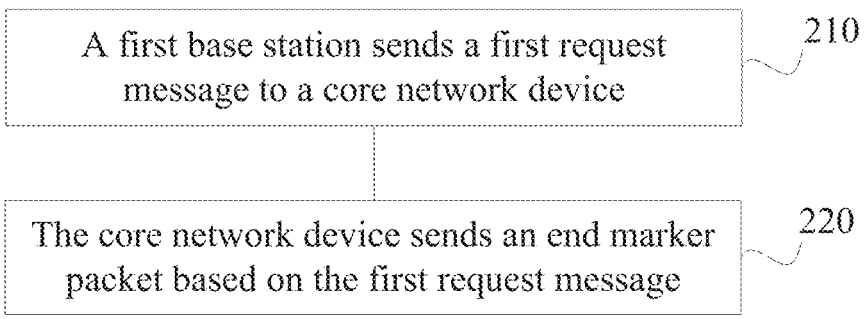
FIG. 2 is a schematic flowchart of a transmission method according to an embodiment of this application.

FIG. 2 is a schematic flowchart of a transmission method according to this application. The method shown in FIG. 2 may be applied to a process in which at least one QoS flow (denoted as a QoS flow #1) in a first PDU session of a terminal is transferred to a target base station. For example, in a dual connectivity scenario, the QoS flow #1 in the first PDU session of the terminal is transferred to the target base station (a master base station or a secondary base station base station), and other QoS flow in the first PDU session remains in a source base station (a secondary base station or a master base station). The transmission method in this embodiment of this application is described below in detail with reference to FIG. 2.

S210. A first base station sends a first request message to a core network device.

The first request message includes an identity of the first PDU session and an identity of the QoS flow #1. The first request message is used to request to change a user plane route of the QoS flow #1 to a second base station.

It should be understood that the first base station may be the master base station in the dual connectivity scenario. When the master base station is the source base station, the secondary base station is the second base station. That is, the first base station and the second base station are different base stations. When the master base station is the target base station, the master base station is the second base station. That is, the first base station and the second base station are a same base station.

It should further be understood that the core network device is a device compatible with a function of a core network user plane device and a function of a core network control plane device.

Optionally, the first request message may be a path switch request message. This may be more compatible with the prior art.

S220. The core network device sends an end marker packet based on the first request message.

Specifically, if a core network user plane consents to change the user plane route of the QoS flow #1 to the second base station, the end marker packet is sent to the second base station. The end marker packet includes the identity of the QoS flow #1. The end marker packet indicates that the core network device stops sending a data packet of the QoS flow #1 in a source data tunnel of the first PDU session. In other words, the end marker packet indicates that the core network user plane no longer sends the data packet of the QoS flow #1 in the source data tunnel.

The end marker packet may be an empty data packet. In addition, an encapsulation header of the empty data packet may carry an end marker. For example, the end marker may be carried in a General Packet Radio Service tunneling protocol user plane (GTPU) header or extension header. The encapsulation header of the empty data packet may carry the identity of the QoS flow #1.

Further, the core network device may send several end marker packets, to increase a success rate of correctly receiving the end marker packet by the source base station.

It should be noted that, if the first base station is the source base station of the QoS flow #1, step S220 is specifically: the core network device sends an end marker packet to the first base station based on the first request message. If the first base station is the target base station of the QoS flow #1, the first base station and the second base station are the same base station, and step S220 is specifically: the core network device sends the end marker packet to the second base station or the first base station based on the first request message.

According to the transmission method in this embodiment of this application, the core network device sends an end marker packet based on a first request message sent by an access network device, so as to indicate, to the access network device, that a core network user plane device terminates downlink transmission of a QoS flow in a source data tunnel. In this way, switching of downlink transmission at a level or granularity of a QoS flow can be implemented, and thereby system flexibility can be improved.

Figure 3:
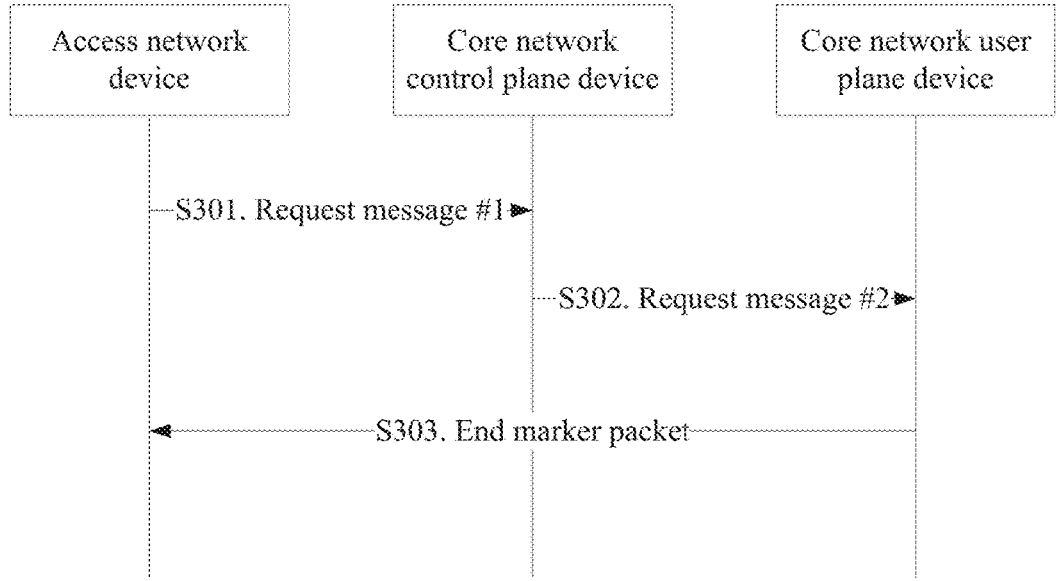
FIG. 3 is a schematic flowchart of a transmission method according to an embodiment of this application.

FIG. 3 is a schematic flowchart of another transmission method according to this application. The method shown in FIG. 3 may be applied to a process in which at least one QoS flow (denoted as a QoS flow #1) or all QoS flows in a first PDU session of a terminal are transferred to a target base station. For example, during switching, all the QoS flows in the first PDU session of the terminal are transferred to the target base station; or all the QoS flows in the first PDU session are to be transferred to the target base station, but only a QoS flow #1 is accepted successfully by the target base station. For another example, in a dual connectivity scenario, the QoS flow #1 in the first PDU session of the terminal is transferred to the target base station (a master base station or a secondary base station), and other QoS flow in the first PDU session remains in a source base station (a secondary base station or a secondary base station).

The transmission method in this embodiment of this application is described below in detail with reference to FIG. 3.

S301. An access network device sends a request message #1 to a core network control plane device. The request message #1 includes an identity of the first PDU session.

Optionally, the route changing request message may further include an identity of the QoS flow #1.

Specifically, the access network device may be a source base station, or may be a target base station. When the route changing request message 1 is sent by the source bases station, the request message #1 further includes the identity of the QoS flow #1. The request message #1 is used to request to change a use plane route of the QoS flow #1 in the first PDU session to the target base station. It should be understood that the source base station herein is the master base station or the secondary base station in the dual connectivity scenario. Correspondingly, the target base station herein is the secondary base station or the master base station in the dual connectivity scenario. When the request message #1 is sent by the target base station, if the request message #1 includes only the identity of the first PDU session, the route changing request message is used to request to switch a data tunnel of the first PDU session towards the target base station.

Further, the request message #1 may further include independent indication information (denoted as indication information #1A). The indication information #1A is used to indicate whether the data tunnel of the first PDU session is switched or a route of the QoS flow #is changed.

It should be understood that, in all embodiments described in this application, switching of the data tunnel of the first PDU session means that the data tunnel corresponding to the first PDU session between a core network user plane device and the source base station is no longer used after the data tunnel switching is completed. After the data tunnel switching is completed, the core network user plane device and the terminal use a data tunnel that corresponds to the first PDU session and that is between the core network user plane device and the target base station for data transmission. Changing of the user plane route of the QoS flow #1 means that the QoS flow #1 whose route is changed is transmitted over a data tunnel that corresponds to the QoS flow #1 and that is between the core network user plane device and the target base station, and that a QoS flow whose route is unchanged in the first PDU session continues to be transmitted over a data tunnel that corresponds to the first PDU session and that is between the core network user plane device and the source base station.

Optionally, the request message #1 may be a path switch request message. This may be more compatible with the prior art.

S302. The core network control plane device sends a request message #2 to a core network user plane device.

The request message #2 may be the same as or may be different from the request message #1. When the request message #2 is different from the request message #1, the request message #2 is generated by the core network control plane device based on the request message #1, and the request message #2 includes the identity of the first PDU session. Optionally, the request message #2 may further include the identity of the QoS flow #1.

S303. The core network user plane device changes a route of a data packet and sends an end marker packet to a source base station.

The end marker packet includes the ID of the QoS flow #1. The end marker packet is used to indicate, to the source base station, that the core network user plane device no longer sends a data packet of the QoS flow #1 to the source base station.

Specifically, if the request message #1 includes only the ID of the first PDU session or further includes the indication information #1, the core network user plane device sends the end marker packet to the source base station. Alternatively, the route changing request message 1 further includes the ID of the QoS flow #1 or further includes the ID of the QoS flow #1 and the indication information #1, and the core network user plane device sends the end marker packet to the source base station.

Further, the core network user plane device may send several end marker packets, to increase a success rate of correctly receiving the end marker packet by the source base station.

The end marker packet may be an empty data packet (namely, the end marker packet does not contain user data). In addition, an encapsulation header of the empty data packet may carry an end marker. For example, the end marker may be carried in a GTPU header or extension header. The encapsulation header of the empty data packet may carry the identity of the QoS flow #1.

Optionally, a format of the end marker packet in step S303 may include a plurality of QoS flow fields, and the plurality of QoS flow fields are in one-to-one correspondence with a plurality of QoSs. In this embodiment of this application, the end marker packet sent in step S303 may alternatively be a dedicated end marker packet. In this case, the end marker packet may carry the ID of the QoS flow #1, or may not carry the ID of the QoS flow #1.

For example, if the request message #1 is used to request to switch the data tunnel of the first PDU session towards the target base station, the core network user plane device may send an end marker packet #1 to the source base station. The end marker packet #1 is used to indicate that the core network user plane device no longer sends a data packet of any QoS flow in the first PDU session to the source base station. Further, the end marker packet #1 may further carry indication information (denoted as indication information #1B), and the indication information #1B is used to indicate that the end marker packet #1 is specific to all QoS flows in the first PDU session.

For another example, if the request message #1 is used to request to change the data tunnel of the QoS flow #1 towards the target base station, the core network user plane device may send an end marker packet #2 to the source base station. The end marker packet #2 is used to indicate that the core network user plane device no longer sends the data packet of the QoS flow #1 to the source base station. Further, the end marker packet #2 may further carry indication information (denoted as indication information #1C), and the indication information #1C is used to indicate that the end marker packet #2 is specific to a QoS flow.

It should be understood that the end marker packet #1 and the end marker packet #2 are data packets having different structures.

Further, when QoS flow route changing is performed for the first time, for example, when route changing for the QoS flow #1 is performed, the access network device may notify the core network control plane device of an ID of the target base station and a routing address that is in the target base station and that is of a data tunnel of a PDU session to which the QoS flow whose route is changed belongs. When route changing for a QoS flow in the same PDU session is performed subsequently, the access network device may notify the core network control plane device of only the identity of the target base station or a target routing address.

The foregoing routing address includes a transport layer address and a General Packet Radio Service tunneling protocol tunnel endpoint identifier (GPRS Tunnelling Protocol Tunnel Endpoint Identifier, GTP TE id).

Further, the end marker packet may further carry indication information that is used to indicate that the end marker packet is specific to a QoS flow, or may be used to indicate that the end marker is specific to a QoS flow group. For example, if the base station requests route changing for a group of QoS flows, the core network user plane device may set an end marker packet, to indicate the end of sending data packets of the QoS flow group in the source data tunnel of the PDU session.

According to the transmission method in this embodiment of this application, the core network user plane device sends the end marker packet based on the request message #1 sent by the access network device by using the core network control plane device, so as to indicate, to the source base station, that the core network user plane device terminates downlink transmission of the at least one QoS flow in downlink transmission to the source base station. In this way, switching of downlink transmission at a level or granularity of a QoS flow can be implemented, and thereby system flexibility can be improved.

Figure 4:
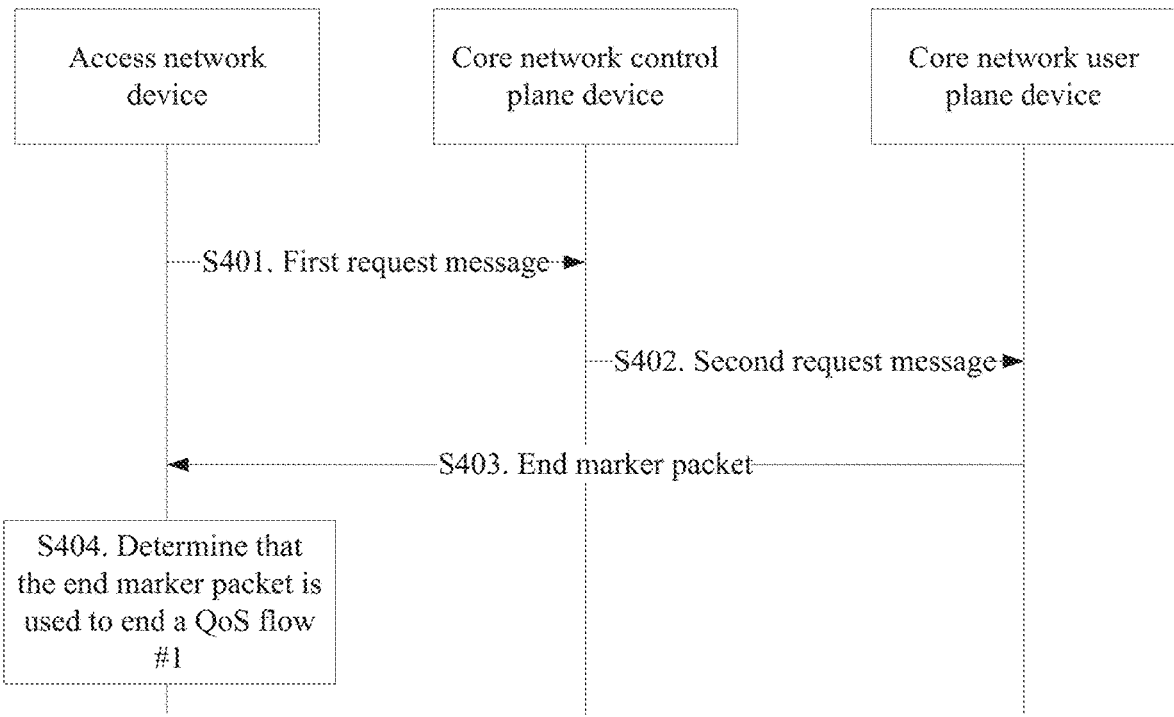
FIG. 4 is a schematic flowchart of a transmission method according to an embodiment of this application.

FIG. 4 is a schematic flowchart of another transmission method according to this application. A core network user plane device in FIG. 4 may be a UPF, and a core network control plane device may be an SMF and/or an AMF. This is not limited in this embodiment of this application.

The method shown in FIG. 4 may be applied to a process in which at least one QoS flow (denoted as a QoS flow #1) or all QoS flows in a first PDU session of a terminal are transferred to a target base station. For example, during switching, all the QoS flows in the first PDU session of the terminal are transferred to the target base station; or all the QoS flows in the first PDU session are to be transferred to the target base station, but only the QoS flow #1 is accepted successfully by the target base station. For another example, in a dual connectivity process, the QoS flow #1 in the first PDU session of the terminal is transferred to the target base station (a master base station or a secondary base station), and a remaining QoS flow in the first PDU session remains in a source base station (a master base station or a secondary base station).

The transmission method in this embodiment of this application is described below in detail with reference to FIG. 4.

S401. An access network device sends a first request message to the core network control plane device.

The first request message is used for requesting the core network user plane device by the core network control plane device to change a user plane route to the target base station.

It should be understood that the access network device may be the source base station, or may be the target base station. When the first request message is sent by the source base station, the first request message is used to request to change a user plane route of at least one QoS flow (denoted as the QoS flow #1) in a PDU session (denoted as the first PDU session) to the target base station. It should be understood that the source base station herein is the master base station or the secondary base station in a multi-connectivity scenario. Correspondingly, the target base station herein is the secondary base station or the master base station in the multi-connectivity scenario. When the route changing request message is sent by the target base station, the route changing request message is used to request to switch a data tunnel of the first PDU session towards the target base station.

S402. The core network control plane device sends a second request message to the core network user plane device based on the first request message, and notifies the core network user plane device to change a route by using the second request message.

S403. The core network user plane device sends an end marker packet to the source base station.

S404. When the source base station determines that the first request message corresponding to the end marker packet is a route changing request message, the source base station may determine that the end marker packet indicates that the core network user plane device terminates transmission of data packets of the QoS flow #1 in a source data tunnel of the first PDU session.

Optionally, the method may further include the following: when the source base station determines that the first request message corresponding to the end marker packet is a path switch request message, the source base station may determine that the end marker packet indicates that the core network user plane device terminates transmission of data packets of all QoS flows in the source data tunnel of the first PDU session.

Specifically, the source base station may determine, based on a type of the message sent by the source base station, whether the end marker packet sent by the core network user plane device is used to end the QoS flow #1 or end the entire first PDU session. If the first request message is the route changing request message, the end marker packet indicates that the core network user plane device terminates the transmission of the data packet of the QoS flow #1 in the source data tunnel of the first PDU session. If the first request message is the path switch request message, the end marker packet indicates that the core network user plane device terminates the transmission of data packets of all the QoS flows in the source data tunnel of the first PDU session.

When the access network device is the master base station, the master base station is the target base station, and the secondary base station is the source base station, the source base station determines, based on message exchange with the target base station, a type of the first request message sent by the target base station to the core network control plane device.

For example, if the source base station sends a handover request message to the target base station, the type of the first request message sent by the target base station to the core network control plane device is the path switch request message.

If the source base station sends, to the target base station, a request message for transfer of some QoS flows of the terminal to the target base station, the type of the first request message sent by the target base station to the core network control plane device is the route changing request message.

Further, the source base station may determine, based on different scenarios, whether the end marker packet corresponds to a QoS flow or a PDU session. For example, in a handover scenario, it is determined that the end marker packet indicates that the core network user plane device terminates the transmission of the data packets of all the QoS flows in the source data tunnel of the first PDU session. In the dual connectivity scenario, the end marker packet indicates that the core network user plane device terminates the transmission of the data packet of the QoS flow #1 in the source data tunnel of the first PDU session.

Further, the core network user plane device may send several end marker packets, to increase a success rate of correctly receiving the end marker packet by the source base station.

The end marker packet may be an empty data packet. In addition, an encapsulation header of the empty data packet may carry an end marker. For example, the end marker may be carried in a GTPU header or extension header.

According to the transmission method in this embodiment of this application, when the source base station or the target base station requests, by using the first request message, the core network user plane device to end transmission of data packets of one or more QoS flows in the source data tunnel, the core network user plane device may use the end marker packet to indicate, to the source base station, that the core network user plane device terminates the transmission of the data packets in the entire PDU session in the source data tunnel. In this way, switching of downlink transmission at a level or granularity of a QoS flow can be implemented, and thereby system flexibility can be improved.

In addition, when the target base station requests, by using the path switch request message, to end the transmission of the data packets of all the QoS flows in the entire PDU session in the source data tunnel, the core network user plane device may also use an end marker packet having a same format to indicate, to the source base station, that the core network user plane device terminates the transmission of the data packets in the entire PDU session in the source data tunnel. The core network user plane device uses the end marker packet having a uniform format, and therefore processing complexity of the end marker packet by the core network user plane device and the source base station can be reduced.

Figure 5:
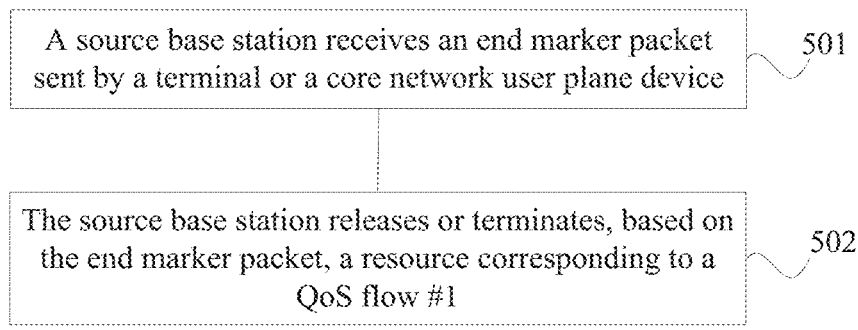
FIG. 5 is a schematic flowchart of a transmission method according to an embodiment of this application.

FIG. 5 is a schematic flowchart of another transmission method according to this application. A core network user plane device in FIG. 5 may be a UPF, and a core network control plane device may be an SMF and/or an AMF.

The transmission method in this embodiment of this application is described below in detail with reference to FIG. 5.

S501. A source base station receives an end marker packet sent by a terminal or the core network user plane device, where the end marker packet includes an identity of a first PDU session and an identity of at least one QoS flow (denoted as a QoS flow #1).

S502. The source base station releases or terminates, based on the end marker packet, a resource corresponding to the QoS flow #1.

Optionally, the source base station releases a parameter of the QoS flow #1 in a context of the terminal.

Specifically, the terminal or the core network user plane device may autonomously determine to terminate transmission of the QoS flow #1. For example, when the terminal determines to terminate uplink transmission of the QoS flow #1, the terminal sends the end marker packet, to notify the source base station of the end of the uplink transmission of the QoS flow #1. After sending the end marker packet, the terminal no longer sends a data packet of the QoS flow #1 to the source base station. For another example, when the core network user plane device determines to terminate downlink transmission of the QoS flow #1, the core network user plane device sends the end marker packet, to notify the source base station of the end of the downlink transmission of the QoS flow #1. After sending the end marker packet, the core network user plane device no longer sends a data packet of the QoS flow #1 to the source base station. After receiving the end marker packet, the source base station no longer sends a data packet of the QoS flow #1 to the terminal.

Optionally, the terminal or the core network user plane device may send several end marker packets, to increase a success rate of correctly receiving the end marker packet by the source base station.

The end marker packet may be an empty data packet. In addition, an encapsulation header of the empty data packet may carry an end marker. For example, the end marker may be carried in a GTPU header or extension header. The encapsulation header of the empty data packet may carry the ID of the QoS flow #1.

According to the transmission method in this embodiment of this application, the terminal or the core network user plane device may send the end marker packet including the ID of a QoS flow, to terminate the transmission of the QoS flow #1.

After receiving the end marker packet, the source base station may release or terminate the resource allocated to the QoS flow #1.

Further, the source base station may release a QoS parameter of the QoS flow #1 in the context of the terminal. The QoS parameter includes but is not limited to indicator parameters such as a latency, a packet loss rate, a priority, and a rate. In this way, system resources are saved.

Transmission methods applied to an inter-system handover process are described below in detail with reference to FIG. 6, FIG. 7, and FIG. 8. Specifically, the transmission methods shown in FIG. 6, FIG. 7, and FIG. 8 may be used in a process of forwarding of a data packet or data.

The data forwarding or the data packet forwarding means that a source base station transmits, to a target base station, a data packet received from a core network user plane device or a terminal, and the target base station sends the data packet received from the source base station to the terminal or the core network user plane device.

In the following description, a first core network control plane device may be an AMF and/or an SMF, a second core network control plane device may be an MME, a first core network user plane device may be a UPF, and a second core network user plane device may be an S-GW.

Figure 6:
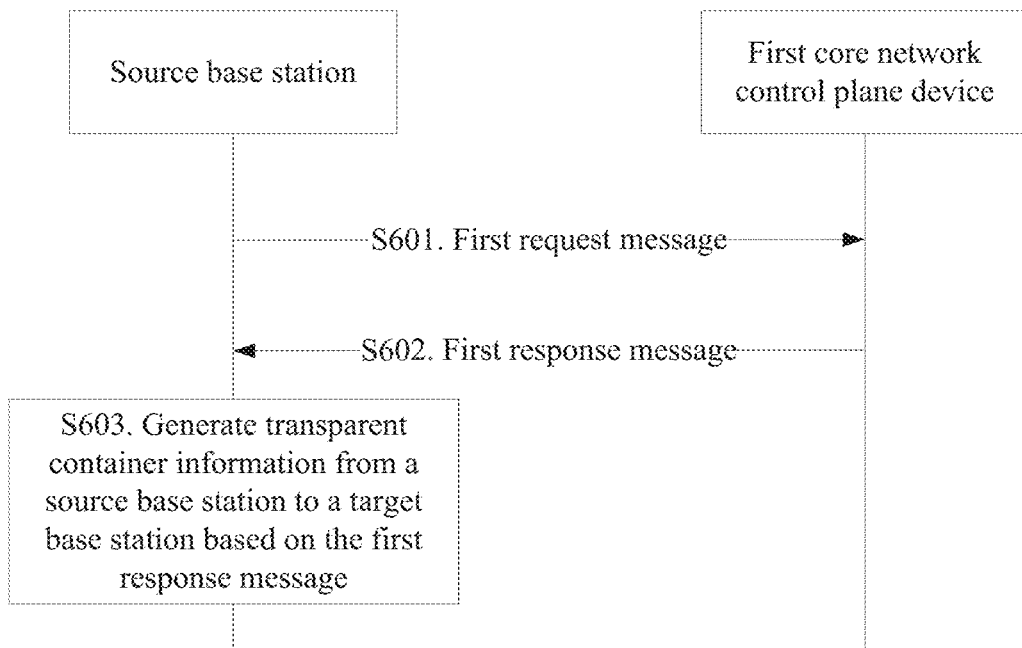
FIG. 6 is a schematic flowchart of a transmission method according to an embodiment of this application.

FIG. 6 is a schematic flowchart of a transmission method according to this application. The transmission method in this embodiment of this application is described below in detail with reference to FIG. 6.

S601. A source base station sends a first request message to a first core network control plane device.

The first request message includes a forwarding indication, and the forwarding indication is used to instruct a first core network user plane device to send a forwarded data packet of a first PDU session to a target base station.

Optionally, the first request message may further include an ID of at least one QoS flow (denoted as a QoS flow #1). Based on an indication of the ID of the QoS flow #1, the source base station requests to perform transmission of the to-be-forward data packet by using the QoS flow #1.

It should be noted that the to-be-forward data packet may be, all data packets for which no reception acknowledgement is received from a terminal, or all data packets that are not yet sent to the terminal, in data packets received by the source base station from the first core network user plane device (for example, a UPF).

S602. The first core network control plane device sends a first response message to the source base station based on the first request message.

The first response message includes an identity of at least one first EPS bearer corresponding to the first PDU session and the forwarding indication.

S603. The source base station generates transparent container information from the source base station to a target base station based on the first response message.

The transparent container information may include radio related information of the source base station, for example, an E-RAB ID list, E-RAB UE history information corresponding to each E-RAB ID, and a forwarding indication. An E-RAB is in one-to-one correspondence with an EPS Bearer. It should be understood that the forwarding indication herein indicates that the E-RAB has data to be forwarded.

S604. The source base station sends a handover request message to the core network control plane device, where the handover request message includes the transparent container information.

Then, nodes, for example, the source base station and the target base station, may perform a handover process according to the prior art. Details are not described herein in this embodiment of this application. In this way, the source base station may indicate, to the target base station, which E-RAB has downlink data to be forwarded.

Figure 7:
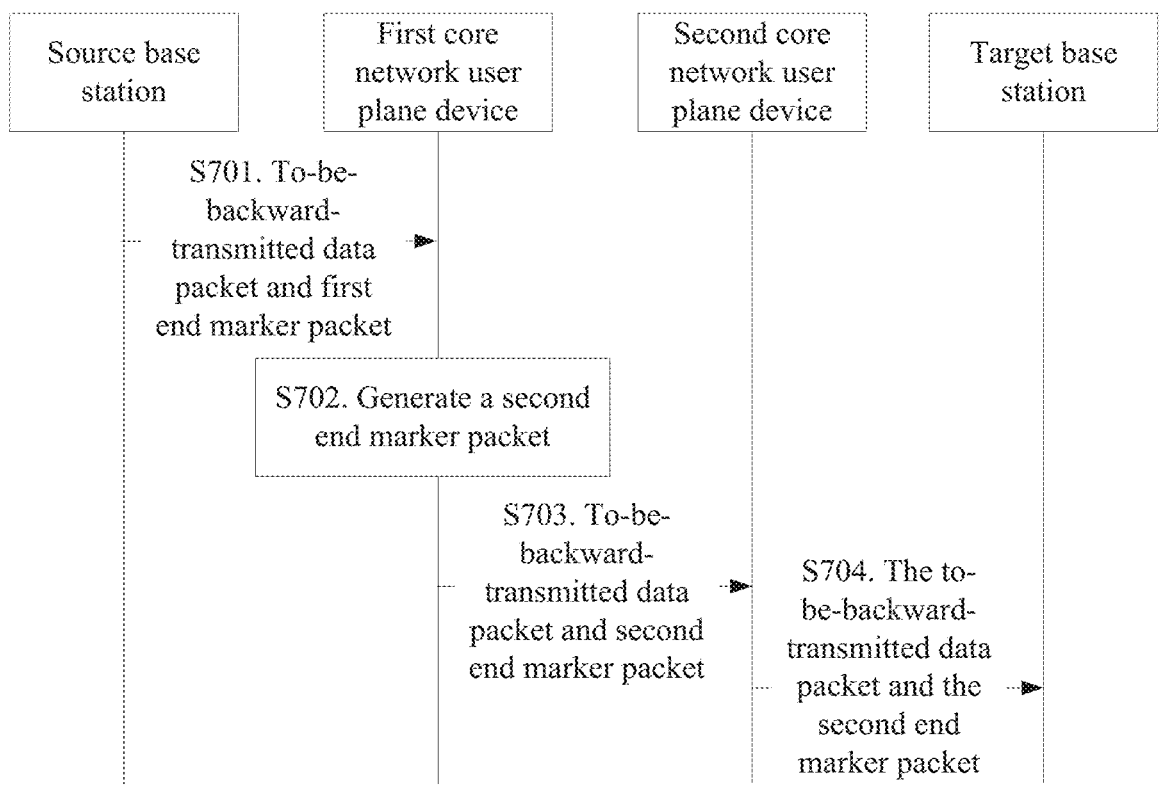
FIG. 7 is a schematic flowchart of a transmission method according to an embodiment of this application.

FIG. 7 is a schematic flowchart of a transmission method according to this application. It should be understood that FIG. 7 is a schematic flowchart of a transmission method according to an embodiment of this application, and shows detailed communication steps or operations of the method, but these steps or operations are merely examples. In this embodiment of this application, other operations or variants of the operations in FIG. 7 may also be performed. In addition, steps in FIG. 7 may be performed in an order different from that shown in FIG. 7, and not all operations in FIG. 7 may be performed.

The transmission method in this embodiment of this application is described below in detail with reference to FIG. 7.

S701. A source base station transmits data received from the first core network user plane device (to-be-forward-transmitted data) and a first end marker packet to a first core network user plane device.

The first end marker packet is received by the source base station from the first core network user plane device. The first end marker packet may be an empty data packet. In addition, an encapsulation header of the empty data packet carries an end marker. For example, the end marker is carried in a GTPU header or extension header.

Specifically, a data tunnel for data forwarding may be established between the source base station and the first core network user plane device. The data forwarding tunnel is established per a PDU session, that is, a data tunnel for forwarding data is established for each PDU session. A data tunnel established per a PDU session and corresponding to a first PDU session may be denoted as a data tunnel #1, and the source base station may forward the data packet and the first end marker packet to the first core network user plane device over the data tunnel #1.

The first end marker packet may be set according to a PDU session, to indicate the end of sending packets in the session; or may be set according to a QoS flow, to indicate the end of sending packets of the QoS flow.

S702. The first core network user plane device generates a second end marker packet based on the first end marker packet and a correspondence between a first session and a first EPS bearer, where the second end marker packet carries an identity of the first EPS bearer.

S703. The first core network user plane device sends the forwarded data packet and the second end marker packet to a second core network user plane device.

Specifically, a data tunnel for data forwarding is established between the first core network user plane device and the second core network user plane device and between the second core network user plane device and a target base station according to an EPS bearer. A data tunnel established according to an EPS bearer and corresponding to the first PDU session may be denoted as a data tunnel #2, and then the first core network user plane device may send the forwarded data packet and the second end marker packet to the second core network user plane device over the data tunnel #2.

S704. The second core network user plane device sends the forwarded data packet and the second end marker packet to the target base station.

S705. After sending the forwarded data packet to a terminal based on the second end marker, the target base station sends a data packet received from the second core network user plane device to the terminal.

Specifically, the target base station first sends the received forwarded data packet, and after determining, based on the second end marker packet, that the forwarded data packet on the EPS bearer has been sent, sends the data packet (that is, a fresh data packet) received from the second core network user plane device. In this way, in-order transmission of data packets on the EPS bearer can be ensured.

In this embodiment of this application, after the target base station receives and detects the second end marker packet, the second end marker packet may be discarded. Further, the target base station may release a resource of the data tunnel #2.

According to the transmission method in this embodiment of this application, the first core network user plane device sets and sends the second end marker packet corresponding to the EPS bearer, so that the target base station can first send, based on the end marker packet, the forwarded data packet received from the source base station, and then sends the fresh data packet received from the second core network user plane device, thereby ensuring the in-order transmission of the data packets on the EPS bearer.

Figure 8:
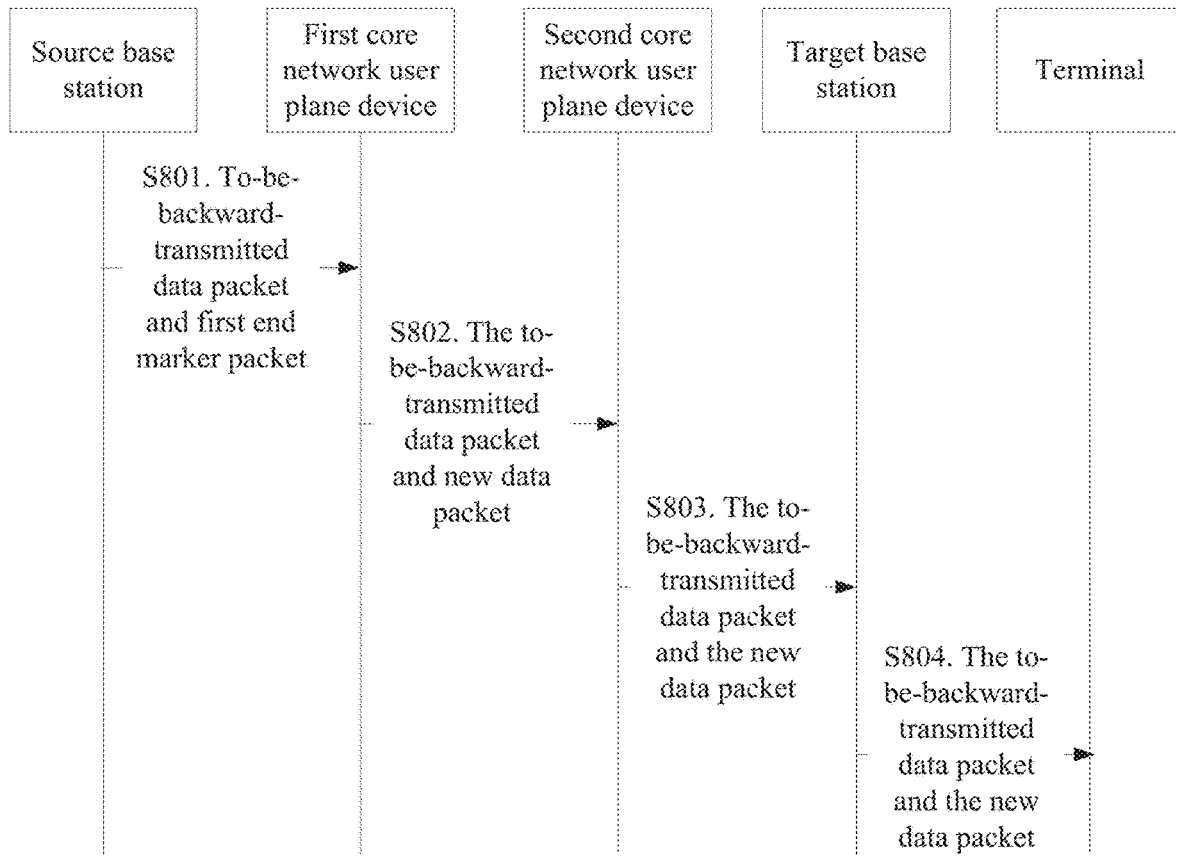
FIG. 8 is a schematic flowchart of a transmission method according to an embodiment of this application.

FIG. 8 is a schematic flowchart of a transmission method according to this application. It should be understood that FIG. 8 is a schematic flowchart of a transmission method according to an embodiment of this application, and shows detailed communication steps or operations of the method, but these steps or operations are merely examples. In this embodiment of this application, other operations or variants of the operations in FIG. 8 may also be performed. In addition, steps in FIG. 8 may be performed in an order different from that shown in FIG. 8, and not all the operations in FIG. 8 may be performed.

The transmission method in this embodiment of this application is described below in detail with reference to FIG. 8.

S801. A source base station transmits data received from the first core network user plane device and a first end marker packet to a first core network user plane device.

The first end marker packet is received by the source base station from the first core network user plane device, and the first end marker packet may be an empty data packet. In addition, an encapsulation header of the empty data packet may carry an end marker. For example, the end marker may be carried in a GTPU header or extension header.

Specifically, a data tunnel for data forwarding may be established between the source base station and the first core network user plane device. The data forwarding tunnel is established according to a PDU session, that is, a data tunnel for transmitting a to-be-forward-data packet is established for each PDU session. A data tunnel established according to a PDU session and corresponding to a first PDU session may be denoted as a data tunnel #1, and then the source base station may send the to-be-forward-data packet and the first end marker packet to the first core network user plane device by using the data tunnel #1.

S802. The first core network user plane device successively sends the forwarded data and a fresh data packet to a second core network user plane device based on the first end marker packet.

Specifically, a data tunnel is established between the first core network user plane device and the second core network user plane device and between the second core network user plane device and a target base station according to an EPS bearer, to transmit forwarded downlink data (that is, a forwarded data packet) of the source base station that is received from the first core network user plane device and the fresh data packet. The data tunnel herein established according to the EPS bearer may be denoted as a data tunnel #3. The first core network user plane device determines, based on the first end marker packet, that the forwarded data has been sent by using the data tunnel #3, and then the first end marker packet is discarded. Then the fresh data packet is sent by using the data tunnel #3.

Further, an encapsulation header of the forwarded data may carry an identity of a QoS flow, and the first core network user plane device determines the data tunnel #3 based on the identity of the QoS flow. For example, a data tunnel corresponding to the EPS bearer is indexed based on a correspondence between the QoS flow and the EPS bearer.

S803. The second core network user plane device successively sends the forwarded data packet and the fresh data packet to a target base station.

S804. The target base station sends a downlink data packet received from the second core network user plane device to a terminal. The downlink data packet includes the forwarded data packet and the fresh data packet.

According to the method in this embodiment of this application, the source base station sends the to-be-forward-data packet to the first core network user plane device, and the first core network user plane device first sends the forwarded data packet received from the source base station and then sends the fresh data packet, thereby ensuring in-order transmission of data packets on the EPS bearer. In addition, a tunnel for forwarding of downlink data does not need to be established between the first core network user plane device and the second core network user plane device and between the second core network user plane device and the target base station, thereby reducing overheads. The target base station does not need to differentiate between the forwarded data and the fresh data packet.

Data forwarding in an inter-system handover is described above, and transmission methods for data forwarding that are applied to the inter-system handover process are described below in detail with reference to FIG. 9, FIG. 10, and FIG. 11.

First, it should be noted that, in the following description with reference to FIG. 9, FIG. 10, and FIG. 11, a data packet that is of a first PDU session and that needs to be sent by a source base station to a target base station is a data packet that needs to be forwarded in data packets of the first PDU session. The data packet that needs to be forwarded in the data packets of the first PDU session may be any one of the following:

(1) all data packets for which no reception acknowledgement is received from a terminal, and/or all data packets that are not yet sent to the terminal, in data packets that are of the first PDU session and that are received by the source base station from a core network user plane device;

(2) a data packet cached in a first SDAP entity of the source base station, that is, a SDAP SDU; or (3) a data packet cached in a first SDAP entity of the source base station and a data packet that is not successfully sent by a PDCP entity.

It should be understood that the first SDAP entity corresponds to the first PDU session. The data packet for which no reception confirmation is received from the terminal, the data packet that is not yet sent to the terminal, and the data packet that is not successfully sent by the PDCP entity are all cached in the PDCP entity. Therefore, the data packet that is of the first PDU session and that needs to be sent by the source base station to the target base station is the data packet cached in the first SDAP entity and/or the data packet cached in the PDCP entity. Specifically, if there is a cached data packet in the first SDAP entity, the data packet that is of the first PDU session and that needs to be sent by the source base station to the target base station is the data packet cached in the first SDAP entity and the data packet cached in the PDCP entity; or if there is no cached data packet in the first SDAP entity, the data packet that is of the first PDU session and that needs to be sent by the source base station to the target base station is the data packet cached in the PDCP entity.

Figure 9:
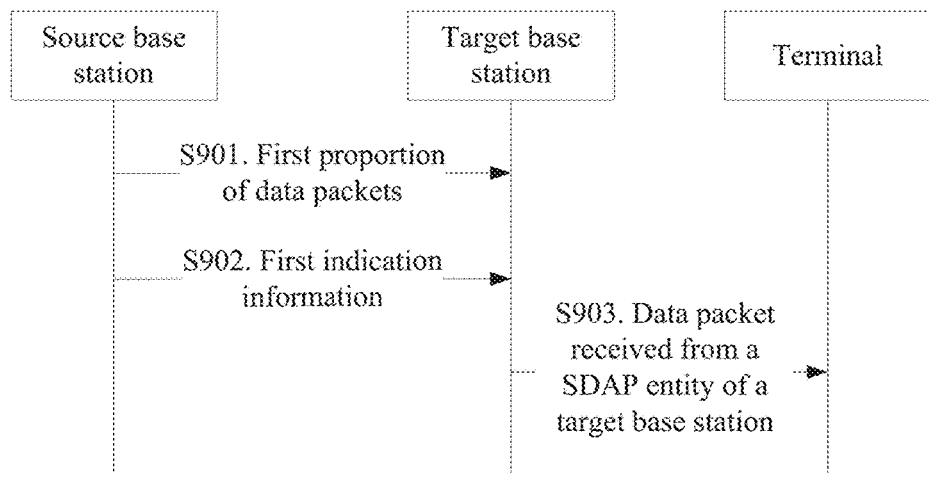
FIG. 9 is a schematic flowchart of a transmission method according to an embodiment of this application.

FIG. 9 is a schematic flowchart of a transmission method according to this application. It should be understood that FIG. 9 is a schematic flowchart of a transmission method according to an embodiment of this application, and shows detailed communication steps or operations of the method, but these steps or operations are merely examples. In this embodiment of this application, other operations or variants of the operations in FIG. 9 may also be performed. In addition, steps in FIG. 9 may be performed in an order different from that shown in FIG. 9, and not all the operations in FIG. 9 may be performed.

The transmission method in this embodiment of this application is described below in detail with reference to FIG. 9.

S901. A source base station sends a first proportion of data packets of a first Packet Data Convergence Protocol (PDCP) entity to a target base station by using a data tunnel between the first PDCP entity and a second PDCP entity of the target base station.

The first proportion of data packets are data packets of a first QoS flow (denoted as a QoS flow #1) in the first protocol data unit (PDU) session. The first PDU session includes at least one QoS flow. The at least one QoS flow is in one-to-one correspondence with at least one PDCP entity. The at least one QoS flow includes the first QoS flow. The at least one PDCP entity includes the first PDCP entity. The first PDCP entity corresponds to the first QoS flow. The first QoS flow is any one of the at least one QoS flow.

S902. The source base station sends first indication information to the target base station. The first indication information is used to indicate that the first proportion of data packets of the first PDCP entity have been sent.

S903. After determining, based on the first indication information, that all data packets of the first proportion of data packets have been sent to a terminal, the target base station sends a data packet received from a SDAP entity of the target base station to the terminal.

Optionally, the first indication information includes a largest PDCP sequence number in PDCP sequence numbers carried by all data packets in the first proportion of data packets; or the first indication information includes a next to-be-allocated PDCP sequence number; or the first indication information is an end marker packet generated by the first PDCP entity.

Optionally, before the source base station sends the first proportion of data packets in the first PDCP entity to the second PDCP entity of the target base station, the method further includes:

receiving, by the first PDCP entity, second indication information sent by the first SDAP entity of the source base station, where the second indication information is used to indicate that the first SDAP entity stops sending data packets of the first QoS flow to the first PDCP entity, the data packets of the first QoS flow that are sent by the first SDAP entity to the first PDCP entity are the first proportion of data packets, and the first SDAP entity corresponds to the first PDU session.

Optionally, the second indication information is sent by the SDAP entity based on an end marker packet received from a core network user plane device.

Figure 10:
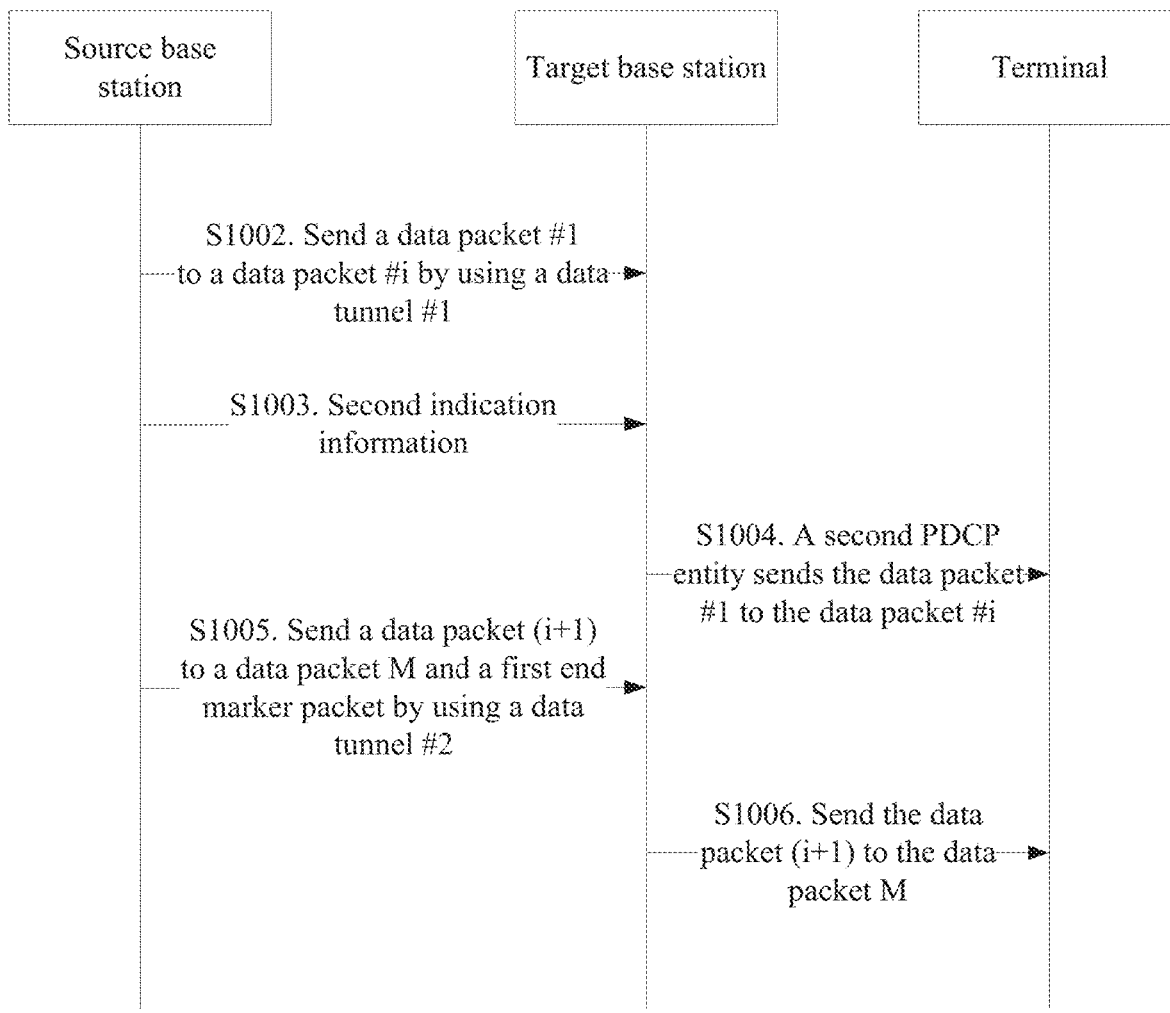
FIG. 10 is a schematic flowchart of a transmission method according to an embodiment of this application.

FIG. 10 is a schematic flowchart of a transmission method according to this application. It should be understood that FIG. 10 is a schematic flowchart of a transmission method according to an embodiment of this application, and shows detailed communication steps or operations of the method, but these steps or operations are merely examples. In this embodiment of this application, other operations or variants of the operations in FIG. 10 may also be performed. In addition, steps in FIG. 10 may be performed in an order different from that shown in FIG. 10, and not all the operations in FIG. 10 may be performed.

The transmission method in this embodiment of this application is described below in detail with reference to FIG. 10.

S1001. A first SDAP entity of a source base station sends first indication information to a first PDCP entity of the source base station.

A first PDU session includes at least one QoS flow, and the at least one QoS flow corresponds to a PDCP entity. A first PDCP in the at least one PDCP entity corresponds to a first QoS flow (denoted as a QoS flow #1) in the first PDU session, and the QoS flow #1 may be any flow in the first PDU session. Therefore, without loss of generality, if the at least one QoS flow included in the first PDU session further includes other QoS flows (denoted as a QoS flow #2 to a QoS flow #R, where R is an integer greater than or equal to 2) in addition to the QoS flow #1, and a data packet that needs to be forwarded exists in the QoS flow #2 to the QoS flow #R, other PDCP entities that are in the at least one PDCP entity and that are in one-to-one correspondence with the QoS flow #2 to the QoS flow #R may perform forwarding of data packets of the QoS flow #2 to the QoS flow #R with reference to the operation of the first PDCP entity.

Specifically, if there is no cached data packet in the first SDAP entity in the source base station, or there is a cached data packet but the first SDAP entity currently stops sending a data packet to the first PDCP entity, the first SDAP entity sends the first indication information to the first PDCP entity. The first indication information is used to indicate that the first SDAP entity no longer sends a data packet of the QoS flow #1 to the first PDCP entity. The first PDCP entity may determine, based on the first indication information, the last data packet sent by the first SDAP entity and received by the first PDCP entity. Optionally, the first indication information may be an end marker packet, and a SDAP header of the end marker packet carries the end marker. The end marker packet may be an empty data packet.

S1002. The first PDCP entity sends data packets (denoted as a data packet #1 to a data packet #i, where i is an integer greater than or equal to 1) that are of a QoS flow #1 and that are cached in the first PDCP entity to a second PDCP entity of a target base station by using a data tunnel (denoted as a data tunnel #1) between the first PDCP entity and the second PDCP entity, where the second PDCP entity corresponds to the QoS flow #1.

It should be understood that the first PDCP entity and the second PDCP entity may use the prior art or a new method to be proposed in the future to establish the data tunnel #1, and this is not limited in this example of this application.

S1003. The source base station sends second indication information to the target base station based on the first indication information.

The second indication information is used to indicate that the first PDCP entity has sent all the data packets, that is, the data packet #1 to the data packet #i, that are of the QoS flow #1 and that are cached in the first PDCP entity.

Specifically, the source base station may determine, based on the first indication information, for example, the end marker packet, the last data packet, that is, the data packet #i, that is sent by the first SDAP entity and that is received by the source base station. Therefore, after sending the data packet #i, the source base station sends the second indication information to the target base station, and notifies, by using the second indication information, the target base station that the source base station has sent all the cached data packets in the first PDCP entity and no longer sends a data packet to the second PDCP entity.

Optionally, the second indication information may be sent by using a message between Xn interfaces, for example, sent by using an SN status transfer (SN STATUS TRANSFER) message.

Further, the first PDCP entity may allocate PDCP SNs to all the data packets cached in the first PDCP entity. In this case, the second indication information may be a largest PDCP sequence number in the data packets cached in the first PDCP entity, that is, a PDCP sequence number of the data packet #i. Alternatively, the second indication information may be a next to-be-allocated largest sequence number.

Optionally, the second indication information may be a second end marker packet, and the second end marker packet carries an end marker.

Specifically, if the data packets cached in the first PDCP entity include a data packet to which a PDCP SN is allocated and a data packet to which no PDCP SN is allocated, the source base station may set the second end marker packet after determining, based on the first indication information, the last data packet (that is, the data packet #i) in the data packets cached in the first PDCP entity, and send the second end marker packet after having sent the data packet #i to the second PDCP entity. The second end marker packet may be an empty data packet, and a GTPU header or a GTPU extension header of the end marker packet may carry the end marker.

Further, the target base station may release a resource of the data tunnel #1 after receiving the second indication information.

S1004. The second PDCP entity sends the data packet #1 to the data packet #i to a terminal.

Optionally, if there is a data packet cached in the first SDAP entity, the method may further include the following steps.

S1005. The first SDAP entity sends a first end marker packet and data packets that are of a first PDU session and that are cached in the first SDAP entity to the second SDAP entity of the target base station by using a data tunnel (denoted as a data tunnel #2) between the first PDCP entity and the second SDAP entity.

For ease of understanding and description, the data packets that are of the first PDU session and that are cached in the first SDAP entity are denoted below as a data packet (i+1) to a data packet M, where M is an integer greater than or equal to 2.

Specifically, the first SDAP entity sends the data packet (i+1) to the data packet M by using the data tunnel #2, and sends the first end marker packet after sending the data packet M. The first end marker packet is received by the first SDAP entity from a core network user plane device. The first end marker packet includes an end marker, and the first end marker packet is used to indicate that the first SDAP entity has sent all the data packets that are of the first PDU session and that are cached in the first SDAP entity. The second SDAP entity corresponds to the first PDU session. After receiving the first end marker packet, the second SDAP entity may determine that the first SDAP entity has sent all the data packets cached in the first SDAP entity.

S1006. After determining, based on the second indication information, that all the data packet #1 to the data packet #i have been sent, the second PDCP entity sends the data packets received from the second SDAP entity, where the second SDAP entity corresponds to the first PDU session.

Specifically, the second PDCP entity may determine, based on the second indication information, that all the data packets received from the first PDCP entity have been sent to the terminal. Then the second PDCP entity sends the data packets that are of the first PDU session and that are received from the second SDAP. In this way, it can be ensured that, after all data packets that need to be forwarded have been sent, data packets after the forwarded data packets are sent, so as to avoid out-of-order of the data packets of the first PDU session.

Referring to step S1005, if the first SDAP entity sends the data packet (i+1) to the data packet M by using the data tunnel #2, in step S1006, after the second PDCP entity determines, based on the second indication information, that all the data packets received from the first PDCP entity have been sent to the terminal, the second PDCP entity sends the data packet (i+1) to the data packet M that are received from the second SDAP. After having sent all the data packets before the first end marker packet, the second SDAP starts to send the data packets that are of the QoS flow #1 and that are received from the core network user plane to the second PDCP entity. In this way, it can be ensured that, after all the received to-be-transmitted data packets have been sent, the data packets after the to-be-transmitted data packets are sent, so as to avoid out-of-order of the data packets of the first PDU session.

In this embodiment of this application, if a mapping relationship between a QoS flow and a DRB in the target base station is inconsistent with that in the source base station, for example, the QoS flow #1 is mapped to a DRB #1 (corresponding to the first PDCP entity) in the source base station, while the QoS flow #1 is mapped to a DRB #2 (corresponding to the second PDCP entity) in the target base station, after the second PDCP entity and PDCP entities corresponding to the QoS flow #2 to the QoS flow #R in the target base station have sent all the forwarded data packets of the first PDU session, the second SDAP entity sends data packets to the second PDCP and the PDCP entities corresponding to the QoS flow #2 to the QoS flow #R in the target base station. In this way, in-order transmission of the data packets of QoS flows can be ensured.

Figure 11:
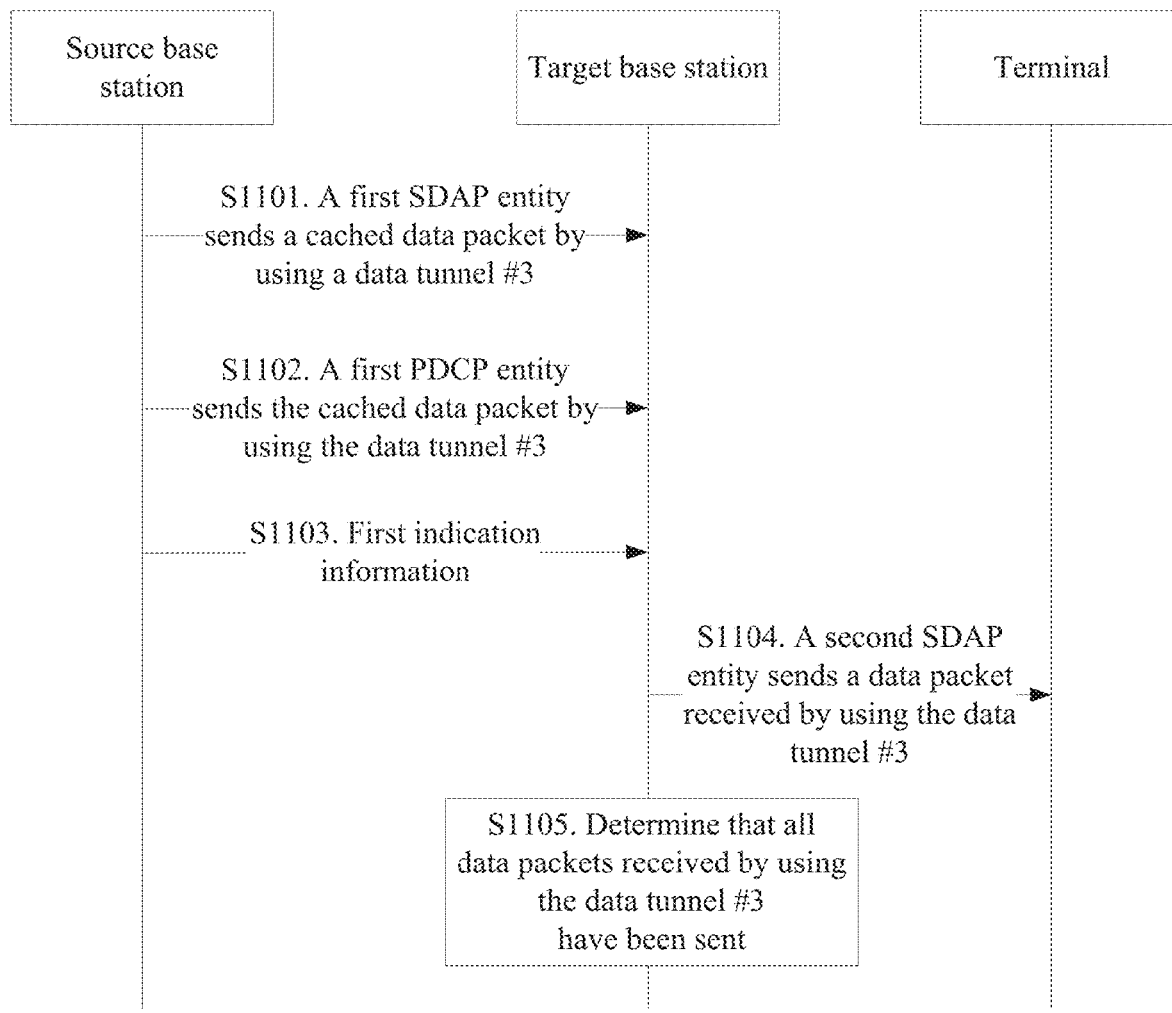
FIG. 11 is a schematic flowchart of a transmission method according to an embodiment of this application.

FIG. 11 is a schematic flowchart of a transmission method according to this application. It should be understood that FIG. 11 is a schematic flowchart of a transmission method according to an embodiment of this application, and shows detailed communication steps or operations of the method, but these steps or operations are merely examples. In this embodiment of this application, other operations or variants of the operations in FIG. 11 may also be performed. In addition, steps in FIG. 11 may be performed in an order different from that shown in FIG. 11, and not all the operations in FIG. 11 may be performed.

The transmission method in this embodiment of this application is described below in detail with reference to FIG. 11.

S1101. A first SDAP entity of a source base station sends a data packet that is of a first PDU session and that is cached in the first SDAP entity to a second SDAP entity of a target base station by using a data tunnel (denoted as a data tunnel #3) between the first SDAP entity and the second SDAP entity.

Optionally, the method may further include the following steps.

S1102. At least one PDCP entity of the source base station sends a data packet that is of the first PDU session and that is cached in the at least one PDCP entity to the second SDAP entity by using the data tunnel #3.

The at least one PDCP entity includes one or more PDCP entities, the one or more PDCP entities are in one-to-one correspondence with one or more QoS flows in the first PDU session, and the at least one PDCP entity may cache all data packets that need to be forwarded in data packets of the first PDU session.

Specifically, when there is no data packet cached in the at least one PDCP entity, the first SDAP sends the data packet that is of the first PDU session and that is cached in the first SDAP entity to the second SDAP entity by using the data tunnel #3. When there is a data packet cached in the at least one PDCP entity, the first SDAP and the at least one PDCP entity send the data packet that is of the first PDU session and that is cached in the first SDAP entity and the data packet that is of the first PDU and that is cached in the at least one PDCP entity to the second SDAP entity by using the data tunnel #3.

S1103. The source base station sends first indication information to the target base station.

Optionally, the first indication information may be an end marker packet. The source base station sends second indication information to the target base station, and the second indication information may be an end marker packet.

For example, there is no data packet cached in the at least one PDCP entity, and all data packets cached in the first SDAP entity are data packets to which no PDCP SN is allocated. In this case, the source base station may send the end marker packet, so as to indicate the end of data packet sending.

For another example, none of the data packets cached in the at least one PDCP entity is allocated a PDCP SN, and all data packets cached in the first SDAP entity are data packets to which no PDCP SN is allocated. In this case, the source base station may send the end marker packet, so as to indicate the end of data packet sending.

Further, the first indication information includes a PDCP SN of the last data packet in the data packets cached in the at least one PDCP entity, or a next to-be-allocated PDCP SN.

For example, the at least one PDCP entity may allocate PDCP SNs to all the data packets cached in the at least one PDCP entity. In this case, the source base station may send the end marker packet to a terminal, to indicate the end of sending the data packets cached in the first SDAP entity, and send the PDCP SN of the last data packet or the next to-be-allocated PDCP SN, to indicate the end of sending the data packets cached in the at least one PDCP entity.

S1104. The second SDAP entity sends, to a terminal, a data packet that is received by using the data tunnel #3.

Specifically, the second SDAP sends, based on a correspondence (or a mapping relationship) between a QoS flow and a PDCP, the data packet received by the second SDAP entity to a corresponding PDCP entity, so that the PDCP entity may perform further processing on the data packet with reference to the prior art until the data packet is sent to the terminal by using a physical layer.

S1105. After determining, based on second indication information, that all data packets received by using the data tunnel #3 have been sent, the second SDAP entity sends a data packet received from a core network user plane device.

Further, if a mapping relationship between a QoS flow and a DRB in the target base station is inconsistent with that in the source base station, to ensure in-order data transmission of the QoS flow, for example, a SDAP entity may deliver a data packet without carrying a PDCP SN to a PDCP entity after PDCP entities of all DRBs corresponding to the PDU session send PDCP SDUs with PDCP SNs.

Further, in another feasible manner, after having sent all PDCP SDUs that carry PDCP SNs and that include a QoS flow, the PDCP entity of the target base station notifies the SDAP entity that all data packets of the QoS flow have been sent; then the SDAP starts to deliver, based on a mapping relationship between a QoS flow and a DRB in the target base station, a data packet that does not carry a PDCP SN and that is of the QoS flow to a PDCP entity corresponding to the DRB.

Figure 12:
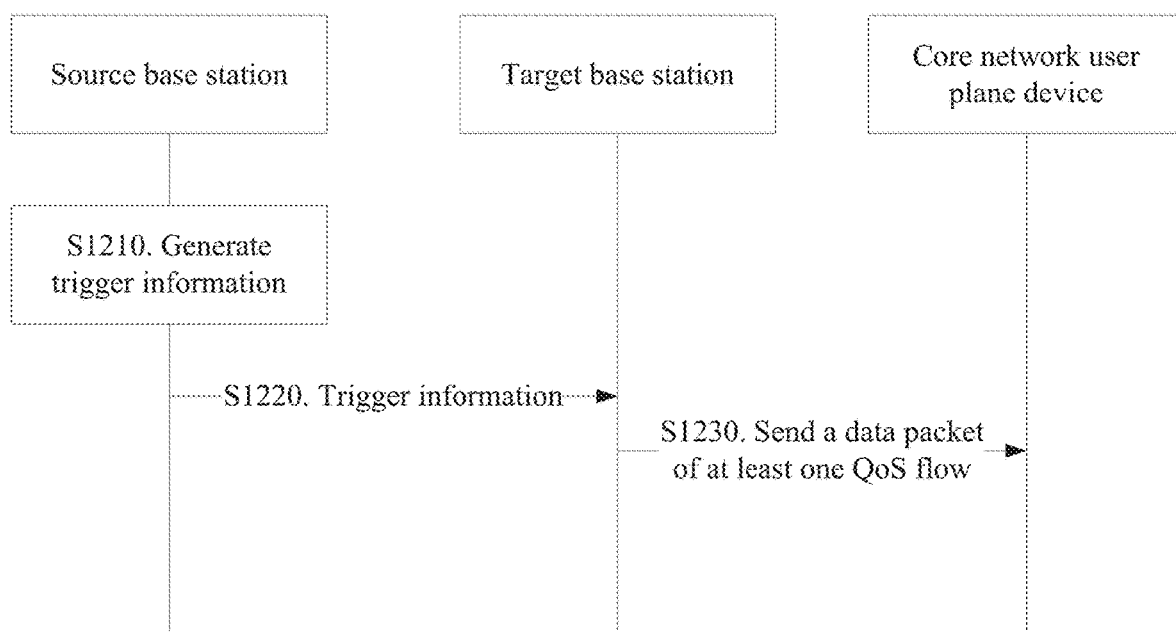
FIG. 12 is a schematic flowchart of a transmission method according to an embodiment of this application.

FIG. 12 is a schematic flowchart of a transmission method according to this application. The method shown in FIG. 12 may be applied to a terminal handover process in a dual connectivity (DC) scenario, and specifically, may be applied to an uplink transmission scenario in which at least one QoS flow (denoted as a QoS flow #1) in a first PDU session is transferred from a source base station to a target base station. The source base station may be a master base station, or may be a secondary base station. Correspondingly, the target base station may be a secondary base station, or may be a master base station. This is not limited in this embodiment of this application.

S1210. When a source base station determines that a terminal no longer sends a data packet of at least one quality of service (QoS) flow in a first protocol data unit (PDU) session to the source base station, the source base station generates start-to-send information.

S1220. The source base station sends the start-to-send information to a target base station. The start-to-send information is used to instruct the target base station to send, to a core network user plane device, a data packet that is of the at least one QoS flow and that is sent by the terminal to the target base station. The start-to-send information includes an identity of the at least one QoS flow and an identity of the first PDU session; or the start-to-send information includes an identity of the at least one QoS flow and an identity of a first DRB, and the first DRB corresponds to the at least one QoS flow.

S1230. The target base station sends, to the core network user plane device based on the start-to-send information, the data packet that is of the at least one QoS flow and that is sent by the terminal to the target base station.

Optionally, the start-to-send information is an end marker packet, or the start-to-send information is a control plane message.

The transmission method shown in FIG. 12 is described in detail with reference to a transmission method shown in FIG. 13.

Figure 13:
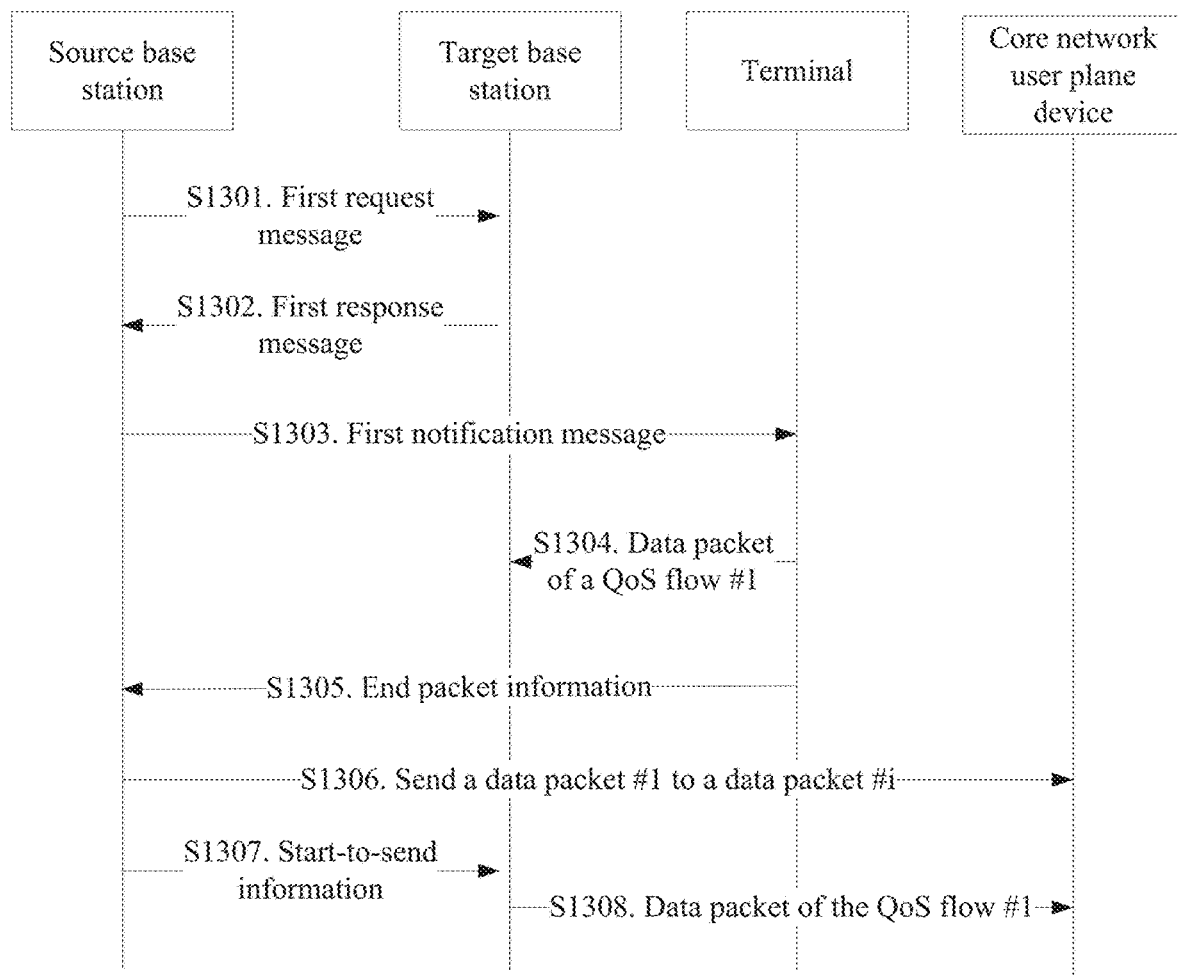
FIG. 13 is a schematic flowchart of a transmission method according to an embodiment of this application.

FIG. 13 is a schematic flowchart of a transmission method according to this application. It should be understood that FIG. 13 is a schematic flowchart of a transmission method according to an embodiment of this application, and shows detailed communication steps or operations of the method, but these steps or operations are merely examples. In this embodiment of this application, other operations or variants of the operations in FIG. 13 may also be performed. In addition, steps in FIG. 13 may be performed in an order different from that shown in FIG. 13, and not all the operations in FIG. 13 may be performed.

The method shown in FIG. 13 may be applied to a terminal handover process in a dual connectivity (DC) scenario, and specifically, may be applied to an uplink transmission scenario in which at least one QoS flow (denoted as a QoS flow #1) in a first PDU session is transferred from a source base station to a target base station. The source base station may be a master base station, or may be a secondary base station. Correspondingly, the target base station may be a secondary base station, or may be a master base station. This is not limited in this embodiment of this application.

In this embodiment of this application, before the QoS flow #1 is transferred to the target base station, a terminal sends a data packet of the QoS flow #1 to the source base station over a DRB (denoted as a DRB #1) between the terminal and the source base station, and the DRB #1 corresponds to the QoS flow #1. If the source base station wants to transfer the QoS flow #1 to the target base station, the source base station and the target base station may interact according to steps S1301 and S1302.

S1301. The source base station sends a first request message to the target base station, where the first request message is used to request to transfer the QoS flow #1 to the target base station.

Specifically, when determining to transfer the QoS flow #1 to the target base station, the source base station sends the first request message to the target base station, and requests the target base station to accept the QoS flow #1 by using the first request message.

Optionally, the first request message may be an Xn interface message, or carried in an Xn interface message.

S1302. If the target base station can accept the QoS flow #1, the target base station sends a first response message to the source base station.

For example, if the target base station determines that a resource of a cell can provide a resource meeting the QoS flow #1, the target base station sends the first response message to the source base station.

Then, data packet transmission may be performed according to the transmission method in this embodiment of this application. Details are described below in detail with reference to FIG. 13.

S1303. The source base station sends a first notification message to the terminal, where the first notification message is used to notify the terminal to send the data packet of the QoS flow #1 to the target base station.

Specifically, the first notification message may be used to notify the terminal to map the QoS flow #1 to a DRB #2, and send the data packet of the QoS flow #1 to the target base station over the DRB #2.

It should be noted that alternatively, step S1303 may not be performed, but the target base station notifies the terminal to send the data packet of the QoS flow #1 to the target base station. For example, the target base station sends the first notification message to the terminal, to notify the terminal to map the QoS flow #1 to the DRB #2, and send the data packet of the QoS flow #1 to the target base station over the DRB #2.

S1304. The terminal sends the data packet of the QoS flow #1 to the target base station.

Specifically, after receiving the first notification message, the terminal stops sending the data packet of the QoS flow #1 to the source base station, and starts to send the data packet of the QoS flow #1 over the DRB #2 to the target base station.

For ease of understanding and description, data packets that are of the QoS flow #1 and that are sent by the terminal to the source base station are denoted below as a data packet #1 to a data packet #i. Namely, the data packets that are of the QoS flow #1 and that are sent by the terminal to the source base station are sequentially: the data packet #1, the data packet #2, . . . , and the data packet #i, where i is an integer greater than or equal to 1.

After the terminal receives the first notification message, the terminal starts to send a data packet after the data packet #i to the target base station. Namely, the terminal successively sends a data packet #(i+1), a data packet #(i+2), . . . , and a data packet #N to the target base station. In this embodiment of this application, it is assumed that a total quantity of the data packets of the QoS flow #1 is N, where N is an integer greater than or equal to 2, and the data packet #N is the last data packet in the data packets that are of the QoS flow #1 and that are sent by the terminal to the target base station.

S1305. The terminal sends end packet information to the source base station.

The end packet information is used to indicate information about the last data packet, that is, information about the data packet #i, in the data packets that are of the QoS flow #1 and that are sent by the terminal to the source base station.

Optionally, the end packet information may be an end marker packet. The end marker packet includes an end marker and identity information of the QoS flow #1.

Optionally, the end packet information may also be a PDCP sequence number (SN) corresponding to the data packet #i.

It should be understood that an order of performing steps S1304 and S1305 is not limited in this embodiment of this application, that is, S1304 may be performed before S1305, or may be performed after S1305, or is performed simultaneously with S1305.

S1306. The source base station sends, to a core network user plane device, data packets, that is, a data packet #1 to a data packet #i, that are of the QoS flow #1 and that are sent by the terminal to the source base station.

S1307. The source base station sends start-to-send information to the target base station after determining, based on the end packet information, that all the data packet #1 to the data packet #i have been sent.

The start-to-send information includes an identity (ID) of the QoS flow #1 and an ID of a first PDU session, or the start-to-send information includes an identity of the QoS flow #1 and an ID of a DRB #2 (that is, a first DRB).

The start-to-send information is used to instruct the target base station to start to send, to the core network user plane device, the data packet that is of the QoS flow #1 and that is sent by the terminal to the target base station.

Further, the source base station may determine, based on an algorithm, time for sending the start-to-send information to the target base station, for example, estimates, based on a data transmission latency, that the data packet sent by the target base station reaches the core network user plane device before the data packet #i.

S1308. The target base station sends, to the core network user plane device based on the start-to-send information, the data packets that are of the QoS flow #1 and that are sent by the terminal to the target base station.

Specifically, after the source base station sends the data packet #i, if it is found based on the end packet that there is no data packet of the QoS flow #1 after the data packet #i, that is, the terminal no longer sends the data packet of the QoS flow #1 to the source base station, the source base station sends the start-to-send information to the target base station. For example, if the data packet #i is followed by the end marker packet, or a PDCP SN of the data packet #i is equal to a PDCP SN sent by the terminal to the source base station, the source base station may determine that there is no data packet of the QoS flow #1 after the data packet #i. In this case, the source base station sends the start-to-send information to the target base station. After receiving the start-to-send information, the target base station starts to send, to the core network user plane device, the data packet #(i+1) to the data packet #N that are received by the terminal over the DRB #1.

Optionally, the start-to-send information may be an Xn interface message, or is carried in an Xn interface message.

Further, the start-to-send information may be end packet information, for example, the end marker packet, or the PDCP SN corresponding to the data packet #i.

The source base station may send the end marker packet by using a data forwarding tunnel between the source base station and the target base station. The source base station may send the end marker packet received from the terminal to the target base station. Alternatively, the source base station may generate the end marker packet by itself. For example, if the source base station determines that the terminal no longer sends the data packet of the QoS flow #1 to the source base station, the source base station may generate the end marker packet.

Further, the start-to-send information may further carry indication information (denoted as indication information #1) indicating a transmission direction of the data packet of the QoS flow #1. The indication information #1 is used to indicate that the transmission direction of the data packet of the QoS flow #1 is an uplink.

According to the transmission method in this embodiment of this application, after the source base station determines, based on the end packet information, that all the data packets of the QoS flow to be transferred to the target base station have been sent by the terminal to the source base station, and the source base station has sent all the data packets that are of the QoS flow and that are received from the terminal to the core network user plane device, the source base station uses the start-to-send information to instruct the target base station to send the data packets of the QoS flow that is transferred from the source base station to the target base station to the core network user plane device. Then, the target base station starts to send the data packets of the QoS flow to the core network user plane device based on the start-to-send information, so as to avoid out-of-order of the data packets of the QoS flow.

Figure 14:
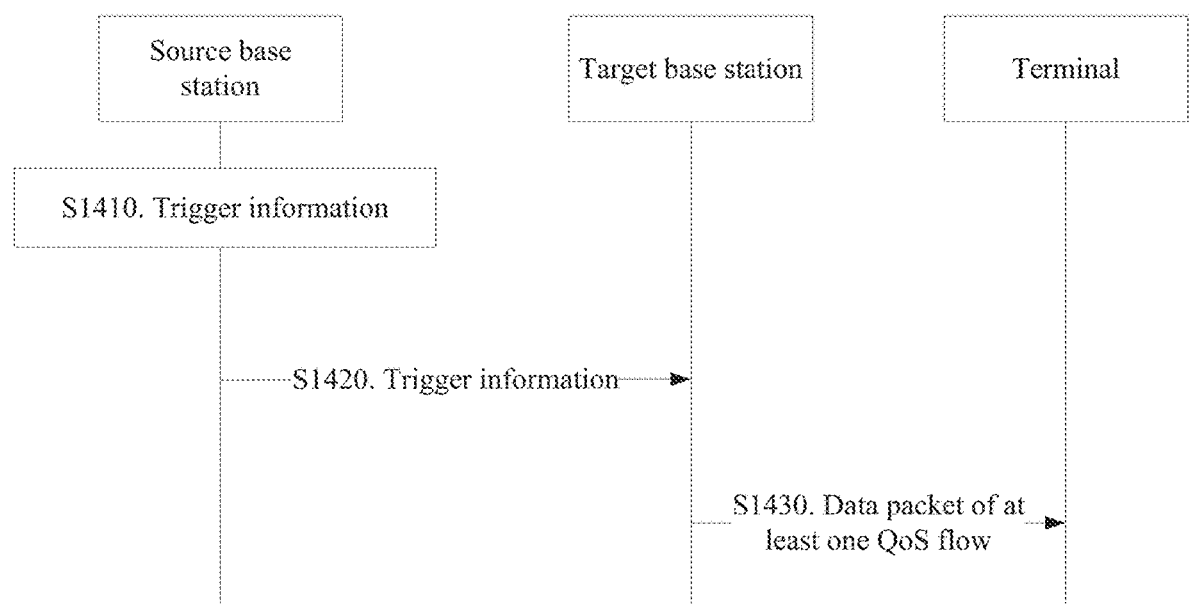
FIG. 14 is a schematic flowchart of a transmission method according to an embodiment of this application.

FIG. 14 is a schematic flowchart of a transmission method according to another embodiment of this application.

S1410. When a source base station determines that a terminal receives a data packet that is of at least one quality of service QoS flow in a first PDU session and that is sent by the source base station, the source base station generates start-to-send information.

S1420. The source base station sends the start-to-send information to a target base station, where the start-to-send information is used to instruct the target base station to start to send, to the terminal, a data packet that is of the at least one QoS flow and that is received by the target base station from a core network user plane device The start-to-send information includes an identity of the at least one QoS flow and an identity of the first PDU session; or the start-to-send information includes an identity of the at least one QoS flow and an identity of a first data radio bearer DRB, and the first DRB corresponds to the at least one QoS flow.

S1430. The target base station sends the data packet that is of the at least one QoS flow and that is received from the core network user plane device to the terminal based on the start-to-send information.

Optionally, the start-to-send information is an end marker packet, or the start-to-send information is a control plane message.

Figure 15:
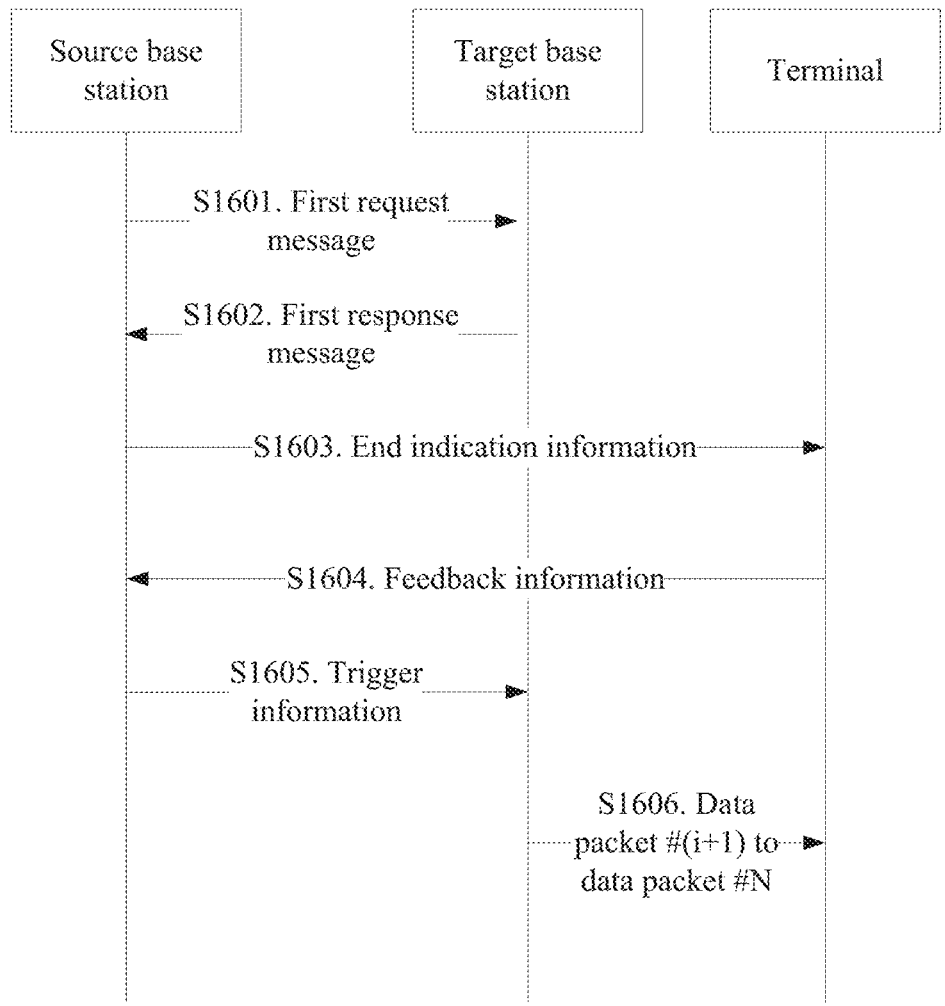
FIG. 15 is a schematic flowchart of a transmission method according to an embodiment of this application.

FIG. 15 is a schematic flowchart of a transmission method according to this application. It should be understood that FIG. 15 is a schematic flowchart of a transmission method according to an embodiment of this application, and shows detailed communication steps or operations of the method, but these steps or operations are merely examples. In this embodiment of this application, other operations or variants of the operations in FIG. 15 may also be performed. In addition, steps in FIG. 15 may be performed in an order different from that shown in FIG. 15, and not all the operations in FIG. 15 may be performed.

The method shown in FIG. 15 may be applied to a terminal handover process in a dual connectivity (DC) scenario, and specifically, may be applied to a downlink transmission scenario in which at least one QoS flow (denoted as a QoS flow #1) in a first PDU session is transferred from a source base station to a target base station. The source base station may be a master base station, or may be a secondary base station. Correspondingly, the target base station may be a secondary base station, or may be a master base station. This is not limited in this embodiment of this application.

In this embodiment of this application, before the QoS flow #1 is transferred to the target base station, a terminal sends a data packet of the QoS flow #1 to the source base station over a DRB (denoted as a DRB #1) between the terminal and the source base station, and the DRB #1 corresponds to the QoS flow #1. If the source base station wants to transfer the QoS flow #1 to the target base station, the source base station and the target base station may interact according to steps S1501 and S1502.

S1501. The source base station sends a first request message to the target base station, where the first request message is used to request to transfer the QoS flow #1 to the target base station.

Specifically, when determining to transfer the QoS flow #1 to the target base station, the source base station sends the first request message to the target base station, and requests the target base station to accept the QoS flow #1 by using the first request message.

S1502. If the target base station can accept the QoS flow #1, the target base station sends a first response message to the source base station.

Then, data packet transmission may be performed according to the transmission method in this embodiment of this application. Details are described below in detail with reference to FIG. 15. The target base station or the source base station sends a route changing message to a network element of a core network, to instruct the core network to change a target routing address of the QoS flow #1.

S1503. The source base station sends end indication information to a terminal.

Specifically, when the source base station determines that the target base station can accept the QoS flow #1, for example, determines, based on the first response message in step S1502, that the target base station can accept the QoS flow #1, the source base station stops sending the data packet of the QoS flow #1 to the terminal, sends the end indication information to the terminal, and uses the end indication information to instruct the source base station to end transmission of the data packets of the QoS flow #1.

Optionally, the end indication information may be an end marker packet. The end marker packet carries an ID of the QoS flow #1.

The end marker packet may be an empty data packet. In addition, an encapsulation header of the empty data packet may carry an end marker. For example, the end marker may be carried in a SDAP or PDCP extension header.

Optionally, the end indication information may be a PDCP SN corresponding to a data packet #i. If the terminal has successfully received a data packet prior to the PDCP SN, it may be determined that all data packets that are of the QoS flow #1 and that are sent by the source base station have been received.

Further, a UPF adds an end marker of a data packet of the QoS flow to a data packet sent to an MN, to indicate the end of sending data packets that are of the QoS flow and that are sent by the UPF to the MN. The UPF may set the end marker of the QoS flow based on QoS flow transfer indication information that is sent by the MN to the core network. Further, the UPF may further set the end marker of the QoS flow based on a path switch indication that is sent by the SN to the core network. The path switch indication is used to indicate that the UPF may start to send the data packet of the QoS flow to the SN. In this way, the MN determines the end of sending the data packets that are of the QoS flow #1 and that are received from the UPF.

For ease of understanding and description, the data packets that are of the QoS flow #1 and that are sent by the source base station to the terminal over the DRB #1 are denoted below as a data packet #1 to a data packet #i. That is, data packets that are of the QoS flow #1 and that are sent by the source base station to the terminal are sequentially: the data packet #1, the data packet #2, . . . , and the data packet #i, where i is an integer greater than or equal to 1. After the source base station sends the data packet #i, the source base station sends the end indication information to the terminal. It should be understood that the DRB #1 corresponds to the QoS flow #1, or a mapping relationship exists between the DRB #1 and the QoS flow #1.

S1504. The source base station receives feedback information sent by the terminal.

If the terminal has successfully received the data packet #1 to the data packet #i, and determines, based on the end indication information sent by the source base station, that all the data packets that are of the QoS flow #1 and that are sent by the source base station have been successfully received, the terminal sends the feedback information to the source base station.

S1505. The source base station sends start-to-send information to the target base station based on the feedback information.

The start-to-send information is used to instruct the target base station to send, to the terminal, the data packet that is of the QoS flow #1 and that is sent by a core network user plane device to the target base station. The start-to-send information includes an identity of the QoS flow #1 and an ID of a first PDU session, or the start-to-send information includes an identity of the QoS flow #1 and an ID of a first DRB (denoted as a DRB #2), and the DRB #2 corresponds to the QoS flow #1.

For ease of understanding and description, data packets that are of the QoS flow #1 and that are sent by the core network user plane device to the target base station are denoted below as a data packet #(i+1) to a data packet #N, where N is an integer greater than or equal to 2. That is, the data packets that are of the QoS flow #1 and that are sent by the core network user plane device to the target base station are sequentially: the data packet #(i+1), the data packet #(i+2), . . . , and the data packet #N.

S1506. The target base station sends a data packet #(i+1) to a data packet #N to the terminal based on the start-to-send information.

Specifically, after the source base station receives the feedback information sent by the terminal, the source base station sends the start-to-send information to the target base station. After the target base station receives the start-to-send information, it may be determined that the source base station has sent all the data packets that are of the QoS flow #1 and that are received from the core network user plane device, and that the terminal has also successfully received these data packets. Then the target base station starts to send the data packet #(i+1) to the data packet #N to the terminal over the DRB #1.

Optionally, the start-to-send information may be the end indication information, for example, an end marker packet, or a PDCP SN corresponding to the data packet #i.

The source base station may send the end marker packet by using a data forwarding tunnel between the source base station and the target base station. The end marker packet may be an empty data packet. In addition, an encapsulation header of the empty data packet carries an end marker. For example, the end marker is carried in a GTPU extension header.

According to the transmission method in this embodiment of this application, after the source base station determines, based on the feedback information, that the terminal has successfully received the data packets that are of the QoS flow and that are sent by the source base station, the source base station uses the start-to-send information to instruct the target base station to start to send the data packets that are of the QoS flow and that are received from the core network user plane device to the terminal, and the target base station starts to send the data packets of the QoS flow to the terminal based on the start-to-send information, so as to avoid out-of-order of the data packets of the QoS flow.

Figure 16:
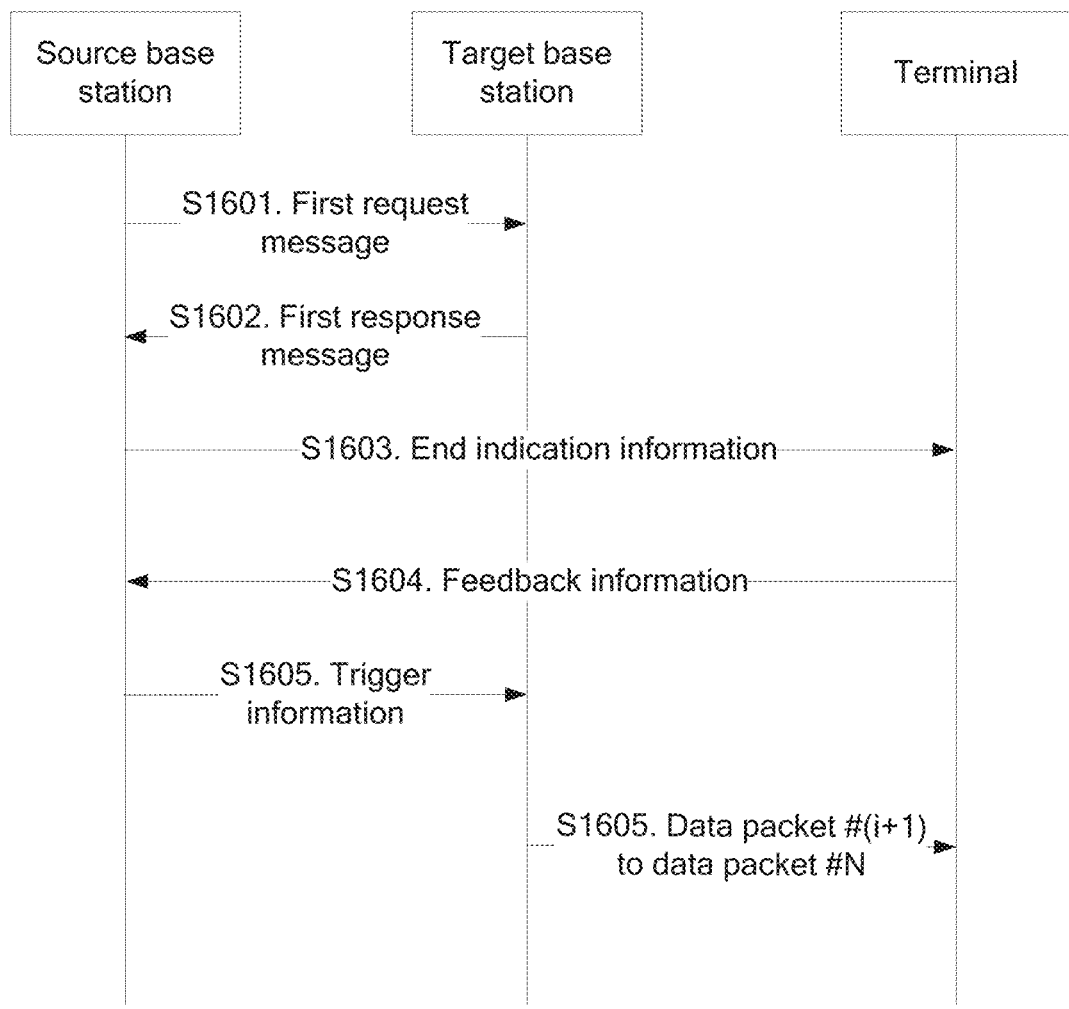
FIG. 16 is a schematic flowchart of a transmission method according to an embodiment of this application.

FIG. 16 is a schematic flowchart of a transmission method according to this application. It should be understood that FIG. 16 is a schematic flowchart of a transmission method according to an embodiment of this application, and shows detailed communication steps or operations of the method, but these steps or operations are merely examples. In this embodiment of this application, other operations or variants of the operations in FIG. 16 may also be performed. In addition, steps in FIG. 16 may be performed in an order different from that shown in FIG. 16, and not all the operations in FIG. 16 may be performed.

The method shown in FIG. 16 may be applied to a terminal handover process in a dual connectivity (DC) scenario, and specifically, may be applied to a downlink transmission scenario in which at least one QoS flow (denoted as a QoS flow #1) in a first PDU session is transferred from a source base station to a target base station. The source base station may be a master base station, or may be a secondary base station. Correspondingly, the target base station may be a secondary base station, or may be a master base station. This is not limited in this embodiment of this application.

In this embodiment of this application, before the QoS flow #1 is transferred to the target base station, a terminal sends a data packet of the QoS flow #1 to the source base station over a DRB (denoted as a DRB #1) between the terminal and the source base station, and the DRB #1 corresponds to the QoS flow #1. If the source base station wants to transfer the QoS flow #1 to the target base station, the source base station and the target base station may interact according to steps S1601 and S1602.

S1601. The source base station sends a first request message to the target base station, where the first request message is used to request to transfer the QoS flow #1 to the target base station.

Specifically, when determining to transfer the QoS flow #1 to the target base station, the source base station sends the first request message to the target base station, and requests the target base station to accept the QoS flow #1 by using the first request message.

Optionally, first indication information may be sent by using an Xn interface message.

S1602. If the target base station can accept the QoS flow #1, the target base station sends a first response message to the source base station.

Then, data packet transmission may be performed according to the transmission method in this embodiment of this application. Details are described below in detail with reference to FIG. 16.

S1603. The source base station sends end indication information to a terminal.

Specifically, when the source base station determines that the target base station can accept the QoS flow #1, for example, determines, based on the first response message in step S1602, that the target base station can accept the QoS flow #1, the source base station stops sending the data packet of the QoS flow #1 to the source base station, sends the end indication information to the terminal, and uses the end indication information to instruct the source base station to end transmission of the data packets of the QoS flow #1.

Optionally, the end indication information may be an end marker packet. The end marker packet carries an ID of the QoS flow #1.

The end marker packet may be an empty data packet. In addition, an encapsulation header of the empty data packet may carry an end marker. For example, the end marker may be carried in a SDAP or PDCP header.

Optionally, the end indication information may be a PDCP SN corresponding to a data packet #i. If the terminal has successfully received a data packet prior to the PDCP SN, it may be determined that all data packets that are of the QoS flow #1 and that are sent by the source base station have been received.

For ease of understanding and description, the data packets that are of the QoS flow #1 and that are sent by the source base station to the terminal over the DRB #1 are denoted below as a data packet #1 to the data packet #i. That is, the data packets that are of the QoS flow #1 and that are sent by the source base station to the terminal are sequentially: the data packet #1, the data packet #2, . . . , and the data packet #i, where i is an integer greater than or equal to 1. After the source base station sends the data packet #i, the source base station sends the end indication information to the terminal. It should be understood that the DRB #1 corresponds to the QoS flow #1, or a mapping relationship exists between the DRB #1 and the QoS flow #1.

S1604. The source base station receives feedback information sent by the terminal.

If the terminal has successfully received the data packet #1 to the data packet #i, and determines, based on the end indication information sent by the source base station, that all the data packets that are of the QoS flow #1 and that are sent by the source base station have been successfully received, the terminal sends the feedback information to the source base station.

S1605. The target base station sends data packets, a data packet #(i+1) to a data packet #N, that are of the QoS flow #1 and that are received from a core network user plane device to the terminal.

For ease of understanding and description, the data packets that are of the QoS flow #1 and that are sent by the core network user plane device to the target base station are denoted below as the data packet #(i+1) to the data packet #N, where N is an integer greater than or equal to 2. That is, the data packets that are of the QoS flow #1 and that are sent by the core network user plane device to the target base station are sequentially: the data packet #(i+1), the data packet #(i+2), . . . , and the data packet #N.

It should be understood that an order of performing steps S1605 and S1604 is not limited in this application, steps S1605 and S1604 may be performed simultaneously, or one step may be performed before the other.

S1606. After receiving the data packets that are of the QoS flow #1 and that are sent by the source base station and the target base station, the terminal first delivers, to an upper protocol layer, the data packets that are of the QoS flow #1 and that are received from the source base station, and then delivers the data packets that are of the QoS flow #1 and that are received from the target base station. That is, the terminal first delivers the data packet #1 to the data packet #N to the upper protocol layer, and then delivers the data packet #(i+1) to the data packet #N. Herein, the terminal may determine, based on the end indication information sent by the source base station, for example, by using the end marker packet, the end of sending the data packets that are of the QoS flow #1 and that are received from the source base station.

According to the transmission method in this embodiment of this application, the terminal may deliver, based on the end marker information sent by the source base station, the data packets that are of the QoS flow and that are received from the source base station to the upper protocol layer, and then delivers the data packets that are of the QoS flow and that are received from the target base station. Therefore, in a process in which the QoS flow is transferred from the source base station to the target base station, in-order transmission of the data packets of the QoS flow can be implemented, thereby ensuring quality of a service and avoid service quality degradation caused by out-of-order of the data packets.

Figure 17:
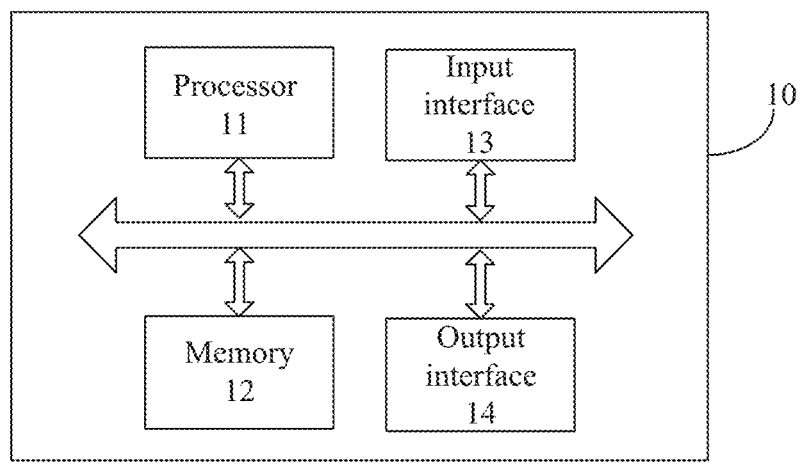
FIG. 17 is a schematic diagram of a data transmission apparatus according to an embodiment of this application.

According to the foregoing methods, FIG. 17 is a schematic diagram of a data transmission apparatus 10 according to an embodiment of this application. As shown in FIG. 17, the apparatus 10 may be a terminal device, or may be a chip or a circuit, for example, may be a chip or a circuit disposed in a terminal. The terminal device may correspond to the terminal device in the foregoing methods.

The apparatus 10 may include a processor 11 (that is, an example of a processing unit) and a memory 12. The memory 12 is configured to store an instruction, and the processor 11 is configured to execute the instruction stored in the memory 12, so that the apparatus 10 performs the steps performed by the terminal device in the foregoing methods.

Further, the apparatus 10 may further include an input interface 13 (that is, an example of a communications unit) and an output interface 14 (that is, another example of the communications unit). Further, the processor 11, the memory 12, the input interface 13, and the output interface 14 may communicate with each other by using an internal connection path, to transmit a control signal and/or a data signal. The memory 12 is configured to store a computer program, and the processor 11 may be configured to invoke the computer program from the memory 12 and run the computer program, to control the input interface 13 to receive a signal and control the output interface 14 to send a signal, so as to complete the steps of the terminal device in the foregoing methods. The memory 12 may be integrated in the processor 11, or may be separate from the processor 11.

Optionally, if the apparatus 10 is the terminal device, the input interface 13 is a receiver, and the output interface 14 is a transmitter. The receiver and the transmitter may be a same physical entity or different physical entities. When being the same physical entity, the receiver and the transmitter may be collectively referred to as a transceiver.

Optionally, if the apparatus 10 is the chip or the circuit, the input interface 13 is an input interface, and the output interface 14 is an output interface.

In an implementation, functions of the input interface 13 and the output interface 14 may be implemented by using a transceiver circuit or a dedicated transceiver chip. The processor 11 may be implemented by using a dedicated processing chip, a processing circuit, a processor, or a general-purpose chip.

In another implementation, the terminal device provided in this embodiment of this application may be implemented by using a general-purpose computer. To be specific, program code for implementing functions of the processor 11, the input interface 13, and the output interface 14 is stored in the memory 12, and the general-purpose processor implements the functions of the processor 11, the input interface 13, and the output interface 14 by executing the code in the memory 12.

Functions or actions of foregoing listed modules or units in the communications apparatus 10 are merely examples, and the modules or units in the communications apparatus 10 may be configured to perform the actions or processing processes performed by the terminal device in any one of the foregoing methods. To avoid repetition, details are omitted herein.

For a concept, explanation, details, and other steps related to the technical solution of the apparatus 10 provided in this embodiment of this application, refer to the foregoing method or description about the content in another embodiment. Details are not described herein again.

Figure 18:
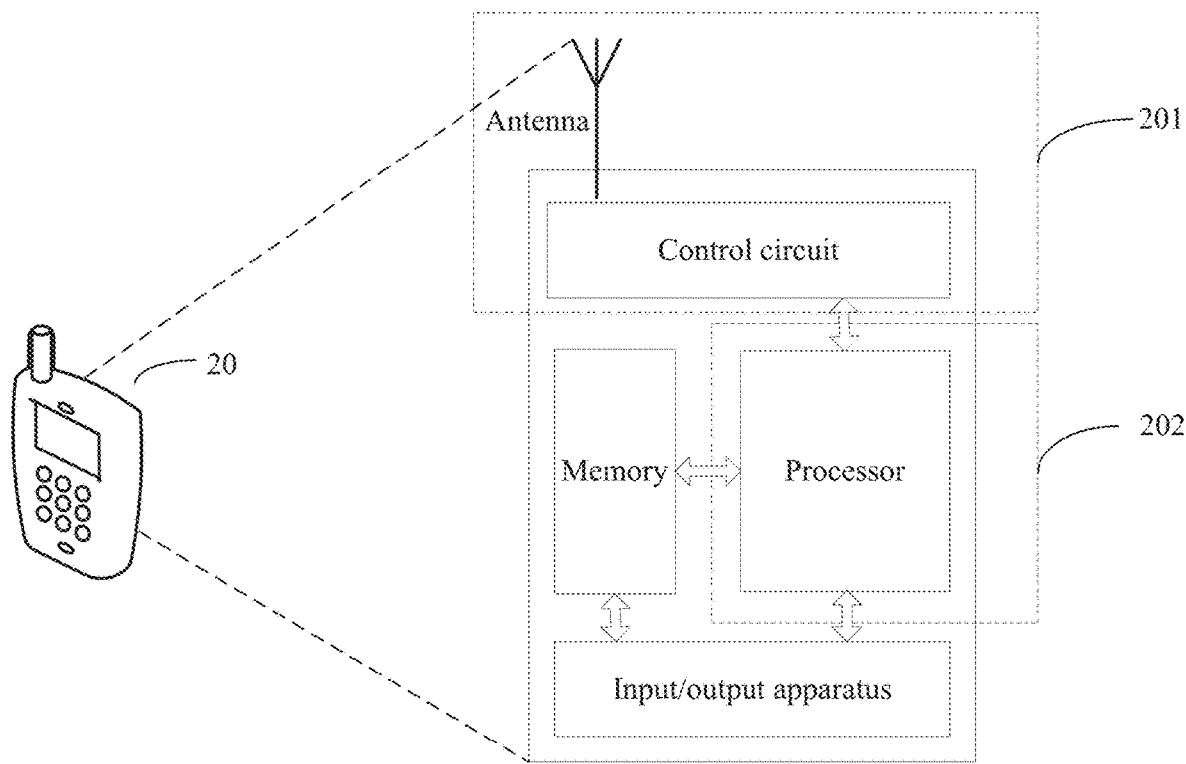
FIG. 18 is a schematic structural diagram of a terminal device according to this application.

FIG. 18 is a schematic structural diagram of a terminal device 20 according to this application. The terminal device 20 may be configured to perform actions of the terminal device described in any one of the foregoing methods. For ease of description, FIG. 18 shows main components of the terminal device. As shown in FIG. 18, the terminal device 20 includes a processor, a memory, a control circuit, an antenna, and an input/output apparatus.

The processor is mainly configured to process a communications protocol and communications data, and control the entire terminal device, execute a software program, and process data of the software program, for example, configured to allow the terminal device to perform the actions described in the foregoing indication method embodiment of the transmission precoding matrix. The memory is mainly configured to store the software program and data, for example, store a codebook described in the foregoing embodiment. The control circuit is mainly configured to perform conversion between a baseband signal and a radio frequency signal, and process the radio frequency signal. The control circuit together with the antenna may also be referred to as a transceiver, which is mainly configured to send and receive a radio frequency signal in a form of an electromagnetic wave. The input/output apparatus, such as a touchscreen, a display screen, or a keyboard, is mainly configured to receive data input by a user and data output by the user.

After the terminal device is powered on, the processor may read the software program in a storage unit, interpret and execute an instruction of the software program, and process the data of the software program. When the data needs to be sent wirelessly, the processor performs baseband processing on the to-be-sent data, and outputs a baseband signal to the radio frequency circuit. The radio frequency circuit performs radio frequency processing on the baseband signal, and sends a radio frequency signal by using the antenna in a form of an electromagnetic wave. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand, for ease of description, FIG. 18 merely shows one memory and one processor. In an actual terminal device, there may be a plurality of processors and memories. The memory may also be referred to as a storage medium or a storage device. This is not limited in this embodiment of this application.

In an optional implementation, the processor may include a baseband processor and a central processor. The baseband processor is mainly configured to process the communications protocol and the communications data, and the central processor is mainly configured to control the entire terminal device, execute the software program, and process the data of the software program. The processor in FIG. 18 integrates functions of the baseband processor and the central processing unit. A person skilled in the art may understand that the baseband processor and the central processing unit may alternatively be independent processors and interconnected by using a bus or another technology. A person skilled in the art may understand that the terminal device may include a plurality of baseband processors to adapt to different network standards, or the terminal device may include a plurality of central processors to enhance its processing capability, and components of the terminal device may be connected by using various buses. The baseband processor may also be expressed as a baseband processing circuit or a baseband processing chip. The central processor may also be expressed as a central processing circuit or a central processing chip. The functions of processing the communications protocol and the communication data may be embedded in the processor, or may be stored in the storage unit in a form of a software program, and the processor executes the software program to implement the baseband processing function.

For example, in this embodiment of this application, an antenna and a control circuit that have a sending and receiving function may be considered as a transceiver unit 201 of the terminal device 20, and a processor having a processing function is considered as a processing unit 202 of the terminal device 20. As shown in FIG. 4, the terminal device 20 includes the transceiver unit 201 and the processing unit 202. The transceiver unit may also be referred to as a transceiver, a transceiver device, a transceiver apparatus, or the like. Optionally, a device for implementing a receiving function in the transceiver unit 201 may be considered as a receiving unit, and a device for implementing a sending function in the transceiver unit 201 is considered as a sending unit, that is, the transceiver unit 201 includes a receiving unit and a sending unit. For example, the receiving unit may also be referred to as a receiver, a receiver device, or a receiver circuit, and the sending unit may be referred to as a transmitter, a transmitter device, or a transmitter circuit.

Figure 19:
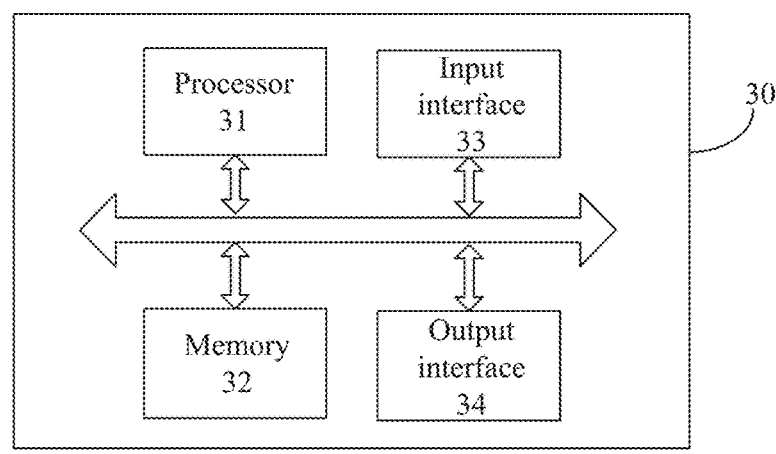
FIG. 19 is a schematic diagram of a data transmission apparatus according to an embodiment of this application.

According to the foregoing methods, FIG. 19 is a schematic diagram 2 of a data transmission apparatus 30 according to an embodiment of this application. As shown in FIG. 19, the apparatus 30 may be a network device, or may be a chip or a circuit, for example, may be a chip or a circuit disposed in the network device. The network device corresponds to a network device in any one of the foregoing methods.

The apparatus 30 may include a processor 31 (that is, an example of a processing unit) and a memory 32. The memory 32 is configured to store an instruction, and the processor 31 is configured to execute the instruction stored in the memory 32, so that the apparatus 30 performs the steps performed by the network device in any one of the foregoing methods.

Further, the apparatus 30 may further include an input interface 33 (that is, an example of a communications unit) and an output interface 34 (that is, another example of the processing unit). Still further, the processor 31, the memory 32, the input interface 33, and the output interface 34 may communicate with each other by using an internal connection path, to transmit a control signal and/or a data signal. The memory 32 is configured to store a computer program, and the processor 31 may be configured to invoke the computer program from the memory 32 and run the computer program, to control the input interface 33 to receive a signal and control the output interface 34 to send a signal, so as to complete the steps of the network device in the foregoing methods 200. The memory 32 may be integrated in the processor 31, or may be separate from the processor 31, to control the input interface 33 to receive the signal, and control the output interface 34 to send the signal, so as to complete the steps of the network device in the foregoing methods. The memory 32 may be integrated in the processor 31, or may be separate from the processor 31.

Optionally, if the apparatus 30 is the network device, the input interface 33 is a receiver, and the output interface 34 is a transmitter. The receiver and the transmitter may be a same physical entity or different physical entities. When being the same physical entity, the receiver and the transmitter may be collectively referred to as a transceiver.

Optionally, if the apparatus 30 is the chip or the circuit, the input interface 33 is an input interface, and the output interface 34 is an output interface.

Optionally, if the apparatus 30 is a chip or a circuit, the apparatus 30 may either not include the memory 32, and the processor 31 may read an instruction (a program or code) in an external memory of the chip to implement the functions of the network device in any one of the foregoing methods.

In an implementation, functions of the input interface 33 and the output interface 34 may be implemented by using a transceiver circuit or a dedicated transceiver chip. The processor 31 may be implemented by using a dedicated processing chip, a processing circuit, a processor, or a general-purpose chip.

In another implementation, the network device provided in this embodiment of this application may be implemented by using a general-purpose computer. To be specific, program code for implementing functions of the processor 31, the input interface 33, and the output interface 34 is stored in the memory, and the general-purpose processor implements the functions of the processor 31, the input interface 33, and the output interface 34 by executing the code in the memory.

Modules or units in the communications apparatus 30 may be configured to perform various actions or processing processes performed by the network device in any one of the foregoing methods. To avoid repetition, details are omitted herein.

For a concept, explanation, details, and other steps related to the technical solution of the apparatus 30 provided in this embodiment of this application, refer to the foregoing method or description about the content in another embodiment. Details are not described herein again.

Figure 20:
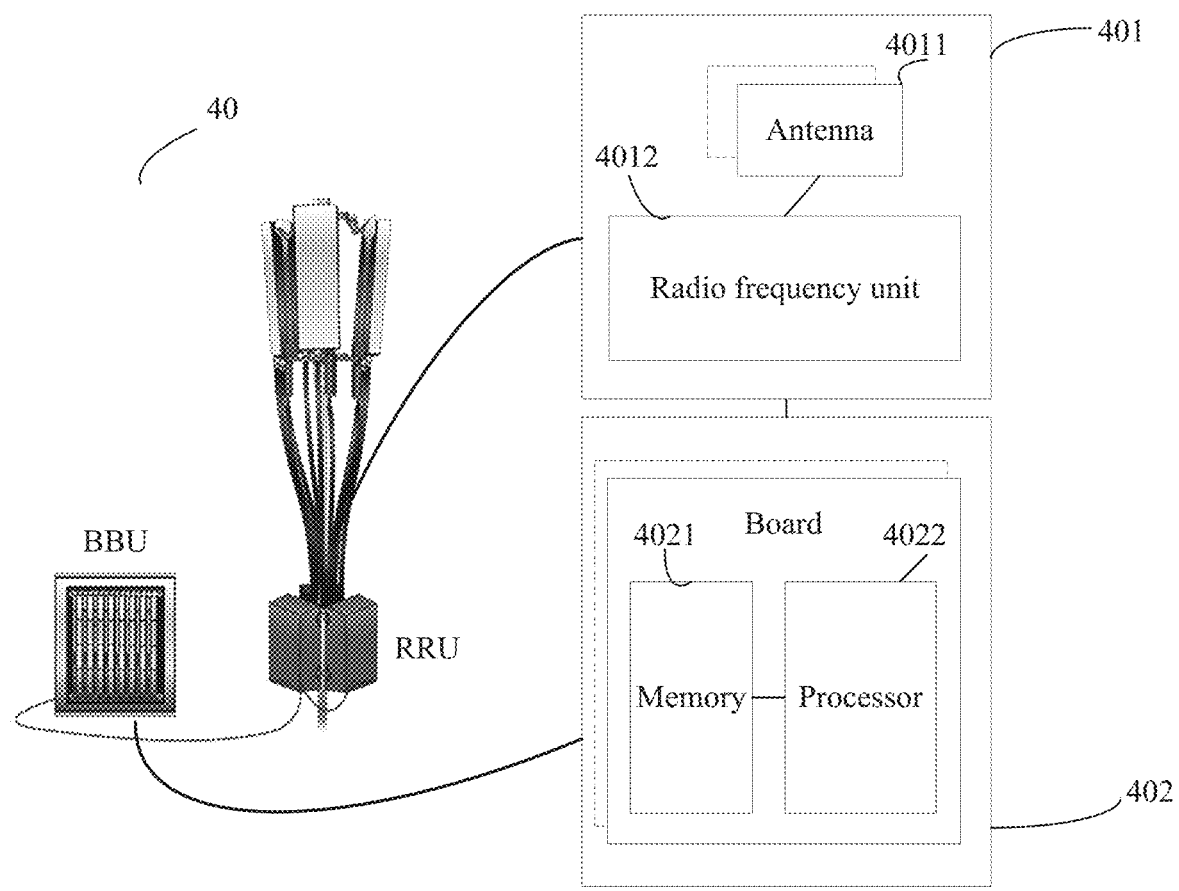
FIG. 20 is a schematic structural diagram of a network device according to an embodiment of this application.

FIG. 20 is a schematic structural diagram of a network device according to an embodiment of this application. The network device may be configured to implement functions of the network device in any one of the foregoing methods. For example, FIG. 20 may be a schematic structural diagram of a base station. As shown in FIG. 20, the base station may be applied to the system shown in FIG. 1. The base station 40 includes one or more radio frequency units, for example, a remote radio unit (RRU) 401 and one or more baseband units (BBUs) (which may also be referred to as digital units, digital unit (DU)) 402. The RRU 401 may be referred to as a transceiver unit, a transceiver, a transceiver circuit, a transceiver device, or the like, and may include at least one antenna 4011 and a radio frequency unit 4012. The RRU 401 is mainly configured to send and receive a radio frequency signal, and perform conversion between the radio frequency signal and the baseband signal, for example, configured to send a signaling message described in the foregoing embodiment to the terminal device. The BBU 402 is mainly configured to perform baseband processing, control the base station, and the like. The RRU 401 and the BBU 402 may be physically disposed together, or may be physically separated, that is, a distributed base station.

The BBU 402 is a control center of the base station, may also be referred to as a processing unit, and is mainly configured to perform baseband processing functions such as channel coding, multiplexing, modulation, and spread spectrum. For example, the BBU (processing unit) 402 may be used to control the base station 40 to perform the operation procedures of the network device in the foregoing method embodiments.

In an example, the BBU 402 may include one or more boards, and a plurality of boards may jointly support a radio access network (such as an LTE system or a 5G system) of a single radio access technology, or may support radio access networks of different radio access technologies. The BBU 402 further includes a memory 4021 and a processor 4022. The memory 4021 is configured to store a necessary instruction and data. For example, the memory 4021 stores a codebook in the foregoing embodiment. The processor 4022 is configured to control the base station to perform a necessary operation, for example, configured to control the base station to perform the operation procedures of the network device in the foregoing method embodiments. The memory 4021 and the processor 4022 may serve one or more boards. In other words, the memory and the processor may be separately configured on each board. Alternatively, a same memory and processor may be jointly configured on a plurality of boards. In addition, a necessary circuit may be disposed on each board.

In a possible implementation, with the development of a System-On-a-Chip (SoC) technology, some or all of the functions of the 402 part and the 401 part may be implemented by the SoC technology, for example, implemented by a base station function chip. The base station function chip integrates devices such as a processor, a memory, and an antenna interface, a program of related functions of the base station is stored in the memory, and the processor executes the program to implement the related functions of the base station. Optionally, the base station function chip can also read the external memory of the chip, to implement the related functions of the base station.

It should be understood that a structure of the base station shown in FIG. 20 is merely a possible form, and should not be construed as any limitation on the embodiments of this application. This application does not preclude a possibility of other forms of base station structure that may occur in the future.

According to the methods provided in the embodiments of this application, an embodiment of this application further provides a communications system, and the communications system includes the foregoing network device and one or more terminal devices.

It should be understood that in the embodiment of this application, the processor may be a central processing unit (CPU), or the processor may be another general-purpose processor, a digital signal processor (DSP), an application-specific integrated circuit (ASIC), a field programmable gate array (FPGA), or another programmable logic device, a discrete gate or transistor logic device, a discrete hardware component, or the like. The general-purpose processor may be a microprocessor, the processor may be any conventional processor, or the like.

It may be further understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not restrictive description, many forms of random access memories (RAM) may be used, for example, a static random access memory (SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions or a computer program. When the computer program instruction or the computer program is loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, infrared, radio, and microwave) manner. The computer-readable storage medium may be any usable medium accessible to a computer, or a data storage device such as a server or a data center, integrating one or more usable media. The usable medium may be a magnetic medium (for example, a soft disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application. It may be clearly understood by a person skilled in the art that, for the purpose of convenient and brief description, for a detailed working process of the foregoing system, apparatus, and unit, reference may be made to a corresponding process in the foregoing method embodiments, and details are not described herein again. In the several embodiments provided in this application, it should be understood that the disclosed system, apparatus, and method may be implemented in other manners. For example, the described apparatus embodiment is merely an example. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments. In addition, functional units in the embodiments of this application may be integrated into one processing unit, or each of the units may exist alone physically, or two or more units are integrated into one unit. When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A communications method, comprising:
   sending, by a master radio access network device, to a core network control plane device a first request message, the first request message comprises an identity of a protocol data unit (PDU) session and an identity of a quality of service (QoS) flow, the first request message requests changing a route of the QoS flow of the PDU session to a secondary access network device;
   sending, by the core network control plane device, to a core network user plane device, a second request message, the second request message notifies the core network user plane device to change a route of the QoS flow of the PDU session, the second request message comprises the identity of the PDU session and the identity of the QoS flow;
   changing, by the core network user plane device, the route of the QoS flow; and
   sending, by the core network user plane device, a first end marker packet to the master radio access network device;
   sending, by the master radio access network device, a second end marker packet to the secondary access network device, wherein the second end marker packet instructs the secondary access network device to send, to the core network user plane device, a data packet that is of the QoS flow and that is sent by a terminal to the secondary access network device;
   wherein the first end marker packet indicates that the core network user plane device no longer sends a data packet of the QoS flow to the master radio access network device.

2. The communications method of claim 1, wherein a number of the first end marker packet is one or more.

3. The communications method of claim 1, wherein the first end marker packet is an empty data packet, an encapsulation header of the empty data packet carries an end marker.

4. The communications method of claim 1, wherein the first end marker packet is carried in a General Packet Radio Service tunneling, protocol user plane (GTPU) header or extension header.

5. The communications method of claim 1, wherein the core network user plane device comprises a user plane function (UPF) device, and the core network control plane device comprises at least one of a session management function (SMF) or an access and mobility management function (AMF) device.

6. The communications method of claim 1, wherein the method further comprises:
generating, by the master radio access network device, the second end marker packet when determining that the terminal no longer sends a data packet of the QoS flow of the PDU session to the master radio access network device.

7. The communications method of claim 1, wherein the first end marker packet is an empty data packet, an encapsulation header of the empty data packet carries an end marker, and the end marker is carried in a General Packet Radio Service tunneling protocol user plane (GTPU) header or extension header.

8. A transmission method comprising:
sending, by a master radio access network device, to a core network control plane device a request message, the request message comprises an identity of a protocol data unit (PDU) session and an identity of a quality of service (QoS) flow, the request message requests changing a route of the QoS flow of the PDU session to a secondary access network device; and
receiving, by the master radio access network device, a first end marker packet from a core network user plane device; wherein the first end marker packet indicates that the core network user plane device no longer sends a data packet of the QoS flow to the master radio access network device; and
sending, by the master radio access network device, a second end marker packet to the secondary access network device, wherein the second end marker packet instructs the secondary access network device to send, to the core network user plane device, a data packet that is of the QoS flow and that is sent by a terminal to the secondary access network device.

9. The transmission method of claim 8, wherein the method further comprises:
generating, by the master radio access network device, the second end marker packet when determining that the terminal no longer sends a data packet of the QoS flow of the PDU session to the master radio access network device.

10. A communications system comprising:
a master radio access network device, a core network control plane device and a core network user plane device; wherein
the master radio access network device is configured to send a first request message to a core network control plane device, the first request message comprises an identity of a protocol data unit (PDU) session and an identity of a quality of service (QoS) flow, the first request message requests changing a route of the QoS flow of the PDU session to a secondary access network device;
the core network control plane device is configured to send a second request message to a core network user plane device, the second request message notifies the core network user plane device to change a route of the QoS flow of the PDU session, the second request message comprises the identity of the PDU session and the identity of the QoS flow;
the core network user plane device is configured to change the route of the QoS flow; and
the core network user plane device is configured to send a first end marker packet to the master radio access network device; and
the master radio access network device is further configured to send a second end marker packet to the secondary access network device, wherein the second end marker packet instructs the secondary access network device to send, to the core network user plane device, a data packet that is of the QoS flow and that is sent by a terminal to the secondary access network device;
wherein the first end marker packet indicates that the core network user plane device no longer sends a data packet of the QoS flow to the master radio access network device.

11. The communications system of claim 10, wherein a number of the first end marker packet is one or more.

12. The communications system of claim 10, wherein the first end marker packet is an empty data packet, an encapsulation header of the empty data packet carries an end marker.

13. The communications system of claim 10, wherein the first end marker packet is carried in a General Packet Radio Service tunneling protocol user plane (GTPU) header or extension header.

14. The communications system of claim 10, wherein the core network user plane device comprises a user plane function (UPF) device, and the core network control plane device comprises at least one of a session management function (SMF) or an access and mobility management function (AMF) device.

15. The communications system of claim 10, wherein
the master radio access network device is further configured to generate the second end marker packet when determining that the terminal no longer sends a data packet of the QoS flow of the PDU session to the master radio access network device.

16. A core network user plane device comprising:
at least one processor, the at least one processor is coupled to a memory and a transceiver, the memory storing instructions that instruct the at least one processor to perform operations comprising:
receiving, by using the transceiver, from a core network control plane device a request message, the request message notifies the core network user plane device to change a route, the request message comprises an identity of a protocol data unit (PDU) session and an identity of a quality of service (QoS) flow;
changing the route of a data packet of the QoS flow; and
sending an end marker packet to a master radio access network device; and
sending a second end marker packet to a secondary access network device, wherein the second end marker packet instructs the secondary access network device to send, to the core network user plane device, a data packet that is of the QoS flow and that is sent by a terminal to the secondary access network device.

17. The core network user plane device of claim 16, wherein the end marker packet is an empty data packet, an encapsulation header of the empty data packet carries an end marker, and the end marker is carried in a General Packet Radio Service tunneling protocol user plane (GTPU) header or extension header.

18. A radio access network device comprising:
at least one processor, the at least one processor is coupled to a memory and a transceiver, the memory storing instructions that instruct the at least one processor to perform operations comprising:
sending to a core network control plane device a request message, the request message comprises an identity of a protocol data unit (PDU) session and an identity of a quality of service (QoS) flow, the request message requests changing a route of the QoS flow of the PDU session to a secondary access network device; and
receiving a first end marker packet from a core network user plane device; wherein the first end marker packet indicates that the core network user plane device no longer sends a data packet of the QoS flow to the radio access network device; and
sending a second end marker packet to the secondary access network device, wherein the second end marker packet instructs the secondary access network device to send, to the core network user plane device, a data packet that is of the QoS flow and that is sent by a terminal to the secondary access network device.

19. The radio access network device of claim 18, wherein the operations further comprises:
generating the second end marker packet when determining that the terminal no longer sends a data packet of the QoS flow of the PDU session to the radio access network device.

* * * * *

UNITED STATES PATENT AND TRADEMARK OFFICE
CERTIFICATE OF CORRECTION

Page 1 of 1

PATENT NO. : 11,917,450 B2
APPLICATION NO. : 17/459667
DATED : February 27, 2024
INVENTOR(S) : Lifeng Han et al.

It is certified that error appears in the above-identified patent and that said Letters Patent is hereby corrected as shown below:

On the Title Page

Column 1 (Related U.S. Application Data), Line 4 (Approx.), Below "(Continued)" insert therefore -- (30) Foreign Application Priority Data August 11, 2017 (CN) ...... 201710687846 --, as a new field entry.

Signed and Sealed this
Eighteenth Day of June, 2024

Katherine Kelly Vidal
*Director of the United States Patent and Trademark Office*